United States Patent
Nishimura et al.

(10) Patent No.: US 11,393,227 B1
(45) Date of Patent: Jul. 19, 2022

(54) LICENSE PLATE RECOGNITION BASED VEHICLE CONTROL

(71) Applicant: SONY GROUP CORPORATION, Tokyo (JP)

(72) Inventors: Hiroaki Nishimura, Paramus, NJ (US); Nikolaos Georgis, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/165,725

(22) Filed: Feb. 2, 2021

(51) Int. Cl.
*G06V 20/62* (2022.01)

(52) U.S. Cl.
CPC ............ *G06V 20/63* (2022.01); *G06V 20/625* (2022.01)

(58) Field of Classification Search
CPC ........ G06N 20/00; G06N 3/08; G06N 3/0454; G06T 2207/20084; G06T 2207/30232; G06T 2207/30236; G06T 2207/30252; G06T 3/4046; G06K 9/00624; G06K 9/00805; G06K 9/6232; G06K 9/6215; G06K 9/64; G06K 9/00791; G06K 2209/15; G06K 9/325; G08G 1/017
See application file for complete search history.

(56) References Cited

U.S. PATENT DOCUMENTS

| | | | | |
|---|---|---|---|---|
| 6,690,294 B1 * | 2/2004 | Zierden | ................... | G08G 1/052 340/936 |
| 7,986,339 B2 * | 7/2011 | Higgins | ................. | G08G 1/054 348/149 |
| 9,104,939 B2 * | 8/2015 | Seyfried | ................. | G06V 20/63 |
| 9,235,988 B2 * | 1/2016 | Mimeault | ............... | G01S 17/86 |
| 9,472,097 B2 | 10/2016 | Stelzig et al. | | |
| 10,546,201 B2 * | 1/2020 | Kang | ......................... | G06N 3/08 |
| 10,643,467 B2 * | 5/2020 | Alon | .................... | G07C 5/0866 |
| 10,705,216 B2 * | 7/2020 | Wang | ..................... | G06V 20/64 |
| 10,757,485 B2 * | 8/2020 | Al-Stouhi | ............... | H04W 4/46 |
| 11,003,919 B1 * | 5/2021 | Ghadiok | ................. | G06V 20/56 |
| 2013/0265414 A1 * | 10/2013 | Yoon | .................. | B60W 30/0956 382/105 |
| 2016/0150070 A1 * | 5/2016 | Goren | ................... | H04W 48/04 455/418 |
| 2018/0211117 A1 * | 7/2018 | Ratti | ....................... | G06N 3/084 |
| 2020/0372794 A1 * | 11/2020 | Park | ..................... | G06K 9/2054 |

FOREIGN PATENT DOCUMENTS

| | | |
|---|---|---|
| CN | 105023439 A | 11/2015 |
| CN | 110136449 A | 8/2019 |
| WO | 2019/185217 A1 | 10/2019 |

\* cited by examiner

*Primary Examiner* — Dung Hong
(74) *Attorney, Agent, or Firm* — Chip Law Group

(57) ABSTRACT

An electronic apparatus and method for license plate recognition-based vehicle control is provided. The electronic apparatus controls at least one of a plurality of image capture devices to capture one or more images of one or more second vehicles different from a first vehicle. The electronic apparatus detects a license plate of a second vehicle of the one or more second vehicles in the captured one or more images. The electronic apparatus further determines a depth map of the detected license plate of the second vehicle of the one or more second vehicles with respect to the first vehicle. The electronic apparatus further detects one or more events related to the second vehicle based on the determined depth map and controls one or more operations of the first vehicle based on the detected one or more events related to the second vehicle.

20 Claims, 9 Drawing Sheets

LICENSE PLATE RECOGNITION BASED VEHICLE CONTROL

CROSS-REFERENCE TO RELATED APPLICATIONS/INCORPORATION BY REFERENCE

None

FIELD

Various embodiments of the disclosure relate to machine learning-based image processing, computer vision, and camera technologies. More specifically, various embodiments of the disclosure relate to an electronic apparatus and method for vehicle control based on license plate recognition.

BACKGROUND

Advancements in radio and laser technology have helped autonomous vehicles to track and measure speed of moving vehicles in a vicinity of the autonomous vehicle. One or more operations of the autonomous vehicles are further controlled based on data collected about the vehicles in a vicinity of the autonomous vehicle. Conventionally, Light Detection and Ranging (LiDAR) sensors, installed in the autonomous vehicles, are used to detect and measure the speed of the vehicles in the vicinity of the autonomous vehicle. However, such LiDAR sensors are quite expensive and therefore widespread implementation of such expensive sensors in the autonomous vehicle is a big hurdle.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic apparatus and method for license plate recognition-based vehicle control is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
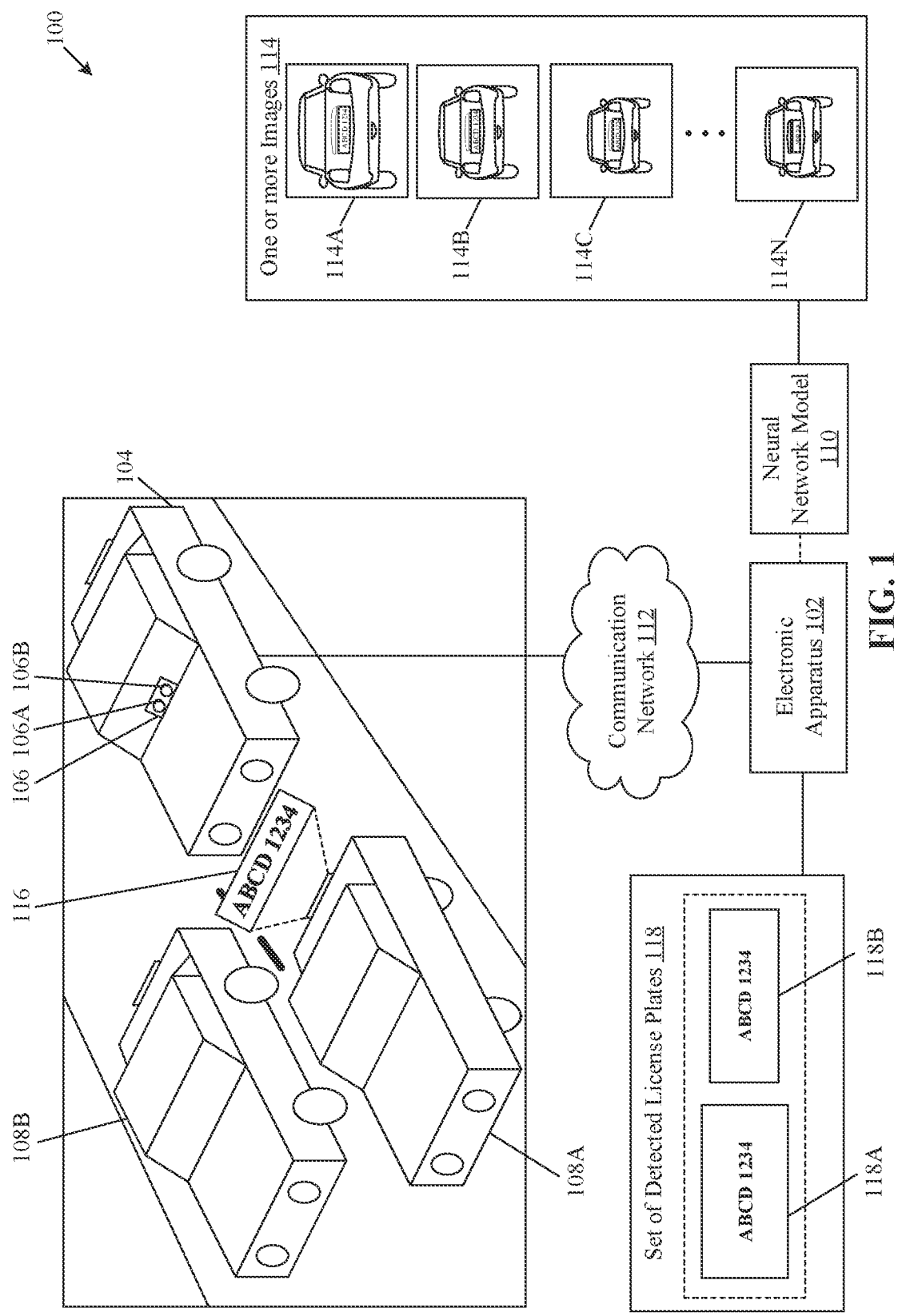
FIG. 1 is a diagram that illustrates an environment for license plate recognition-based vehicle control, in accordance with an embodiment of the disclosure.

The following described implementations may be found in the disclosed electronic apparatus and method for license plate recognition-based vehicle control. The disclosed electronic apparatus may be coupled to (or may include) a plurality of image capture devices (such as a camera) that may be installed in a first vehicle (such as an autonomous vehicle). The disclosed electronic apparatus may control at least one of the plurality of image capture devices to capture one or more images of one or more second vehicles (such as autonomous vehicles or hybrid vehicles or electric vehicles in a vicinity) different from the first vehicle. The disclosed electronic apparatus may further detect a license plate of a second vehicle (such as a vehicle in a vicinity of the first vehicle) in the captured one or more images of the one or more second vehicles. The disclosed electronic apparatus may further determine a depth map (such as distance) of the detected license plate of the second vehicle with respect to the first vehicle. In other words, the depth map may indicate information about distance between the detected license plate of the second vehicle and one or more image capture devices of the first vehicle. The depth map may be determined based on detected fixed size license plate (i.e. real size of license plate) of the second vehicle and pixel information (i.e. size in pixels) about the license plate in the captured one or more images. Based on the determined depth map, the disclosed electronic apparatus may detect one or more events (such as but not limited to, a collision event, an over-taking event) of the second vehicle with respect to the first vehicle. The disclosed electronic apparatus may further control one or more operations (such as, but not limited to, an early warning, operation, braking operation, or an acceleration operation) of the first vehicle based on the detected one or more events related to the second vehicle. As the disclosed electronic apparatus of the first vehicle is capable of using one or more in-expensive cameras to detect the depth map based on the fixed size and the pixel information of the detected license plate of the second vehicle, and to further detect one or more events related to the second vehicle based on the detected depth map, the bill of materials (BOM) for the disclosed electronic apparatus (or cost to detect/track one or more events of the second vehicle) may be significantly less, as compared to that for a traditional LiDAR system that is quite expensive or achieves the same objective (i.e. detection of events of nearby vehicles). This may result in significant cost reduction to control the first vehicle (i.e. autonomous vehicle) based on automatic license plate detection/recognition (ALPD or ALPR) which is capable of deliver high quality and accurate evidential images of license plates of the second vehicle. Therefore, the disclosed electronic apparatus provides a cost-effective solution to detect/track the events of the nearby vehicles in real-time and take appropriate control actions, as compared to the expensive LiDAR systems.

FIG. 1 is a diagram that illustrates an environment for license plate recognition-based vehicle control, in accordance with an embodiment of the disclosure. With reference to FIG. 1, there is shown a diagram of a network environment 100. The network environment 100 includes an electronic apparatus 102, a first vehicle 104, and a plurality of image capture devices 106 installed in the first vehicle 104. The network environment 100 may also include one or more second vehicles that may include a second vehicle 108A, and a third vehicle 108B. With reference to FIG. 1, there is also shown a Neural Network (NN) model 110 (i.e. that may be implemented on the electronic apparatus 102) and a communication network 112.

The electronic apparatus 102 may include suitable logic, circuitry, interfaces, and/or code that may be configured to control the first vehicle 104 based on a license plate recognition. The electronic apparatus 102 may control a first image capture device 106A (or a second image capture device 106B) of the plurality of image capture devices 106 to capture one or more images 114 of the one or more second vehicles. The first vehicle 104 may be controlled based on a distance between the first vehicle 104 and at least one of the one or more second vehicles or changes in a size of a license plate 116 in the one or more images 114 of the second vehicle 108A or changes in font-size of a license plate number of the license plate 116 in the one or more images 114 of the one or more second vehicles. The electronic apparatus 102 may accordingly detect one or more events related to the second vehicle 108A based on the measure distance (or depth map) and further control the first vehicle 104 based on the detected one or more events. As shown in FIG. 1, the electronic apparatus 102 may be communicably coupled with the plurality of image capture devices 106 installed on the first vehicle 104, via the communication network 112. In some other embodiments, the electronic apparatus 102 may be positioned inside or outside the first vehicle 104. Example implementations of the electronic apparatus 102 may include, but are not limited to, in vehicle camera with data processing capability, an in-vehicle Electronic Control Unit (ECU), a mobile data terminal, a vehicle tracking computer, a server, a smartphone, a mobile phone, a computer workstation, and/or any electronic device with an image processing capability.

The first vehicle 104 may be a fully autonomous vehicle, a semi-autonomous vehicle, or a non-autonomous vehicle, for example, as defined by National Highway Traffic Safety Administration (NHTSA). The first vehicle 104 may be registered as an individual vehicle or a police vehicle or may be managed on behalf of a traffic police department or any authorized governmental or non-governmental organization. In an embodiment, the first vehicle 104 may be a vehicle with autonomous drive capability that uses one or more distinct renewable or non-renewable power sources. Examples of the first vehicle 104 may include, but are not limited to, a two-wheeler vehicle, a three-wheeler vehicle, a four-wheeler vehicle, a hybrid vehicle, or any manned or unmanned (driverless) vehicle. The four-wheeler car shown in FIG. 1 is merely provided as an example of the first vehicle 104. The present disclosure may be applicable to other types of vehicle (e.g., a bike or a truck). The description of such types of vehicle is omitted from the disclosure for the sake of brevity.

The plurality of image capture devices 106 may include, but is not limited to, the first image capture device 106A, and a second image capture device 106B. Each of the plurality of image capture devices 106 may include suitable logic, circuitry, and interfaces that may be configured to capture the one or more images 114 of the one or more second vehicles, which may be in a field-of-view (FOV) of the corresponding image capture device. As shown, the captured one or more images 114 of the one or more second vehicles may include, but is not limited to, a first image 114A, a second image 114B, a third image 114C, and an Nth image 114N.

In some embodiments, a first set of parameters associated with each of the plurality of image capture devices 106 may be stored in the electronic apparatus 102. The first set of parameters may include one or more intrinsic and/or one or more extrinsic parameters of each of the plurality of image capture devices. By way of example and not limitation, the first set of parameters may include, but is not limited to, a focal length, a resolution, or an image sensor height of the corresponding image capture device.

In FIG. 1, the first image capture device 106A and the second image capture device 106B are merely shown as an example implementation of a dashcam mounted on a windshield of the first vehicle 104. The present disclosure may be applicable to other suitable implementations of the first image capture device 106A and the second image capture device 106B. The first image capture device 106A and the second image capture device 106B may be mounted on any mounting position on the first vehicle 104 to capture images of one or more second vehicles in any suitable direction with respect to the first vehicle 104. For example, the first image capture device 106A and/or the second image capture device 106B may be placed on a front windshield (facing forward traffic), on a front grill, on a roof, on a rear windshield, on a left/right side or on trunk (facing rearward traffic) of the first vehicle 104. Each mounting position may help the first image capture device 106A and/or the second image capture device 106B to acquire the one or more images 114 of the one or more second vehicles from a particular direction. In FIG. 1, two image capture devices as the plurality of image capture devices 106 on the first vehicle 104 are presented as example. In an embodiment, the plurality of image capture devices 106 may include more than two image capture devices to capture the images of the nearby second vehicles, without deviation from the scope of the disclosure.

Examples of each of the plurality of image capture devices 106 may include, but are not limited to, an image sensor, a wide-angle camera, a handheld video cam, a traffic camera, a closed-circuit television (CCTV) camera, a body camera (e.g. a police body camera), a dash camera (e.g., a dash camera on-board a police vehicle), an in-vehicle camera, a 360 degree camera, a Camera-Serial Interface (CSI) camera, an action camera, a camcorder, a digital camera, camera phones, a time-of-flight camera (ToF camera), a night-vision camera, and/or other image capture devices. In some embodiments, each of the plurality of image capture devices 106 may be in a stereo set-up.

In an embodiment, the first vehicle 104 may include a linear and/or rotary actuator, onto which the first image capture device 106A and/or the second image capture device 106B may be mounted. Based on a human input or an instruction from the electronic apparatus 102, the first image capture device 106A and/or the second image capture device 106B may rotated or moved to face in different directions. In another embodiment, the first image capture device 106A may be a 360-degree camera (not shown) mounted on the roof of the first vehicle 104 to cover a 360-degree FOV of a surrounding environment (including one or more second vehicles).

The one or more second vehicles may include, but is not limited to, the second vehicle 108A and the third vehicle 108B. The second vehicle 108A and the third vehicle 108B may be a non-autonomous vehicle, a semi-autonomous vehicle, or a fully autonomous vehicle, for example, as defined by National Highway Traffic Safety Administration (NHTSA). The second vehicle 108A and the third vehicle 108B may lie within a predetermined distance (i.e. proximity) from the first vehicle 104. Examples of the second vehicle 108A and the third vehicle 108B may include, but are not limited to, a two-wheeler vehicle, a three-wheeler vehicle, a four-wheeler vehicle, a truck, a bus, a hybrid vehicle, or any manned or unmanned (driverless) vehicle which can carry a license plate. The four-wheeler car shown as the second vehicle 108A and the third vehicle 108B in FIG. 1 is merely provided as an example. The present disclosure may be applicable to other types of vehicle (e.g., a bike or a truck). The description of such types of vehicle is omitted from the disclosure for the sake of brevity. In FIG. 1, two second vehicles close to the first vehicle 104 are presented as example. In an embodiment, the one or more second vehicles may include only one vehicle or more than two second vehicles, without deviation from the scope of the disclosure.

The neural network (NN) model 110 may be referred to as a computational network or a system of artificial neurons, where each layer of the NN model 110 may include artificial neurons as nodes. Outputs of all the nodes in the NN model 110 may be coupled to at least one node of preceding or succeeding layer(s) of the NN model 110. Similarly, inputs of all the nodes in the NN model 110 may be coupled to at least one node of preceding or succeeding layer(s) of the NN model 110. Node(s) in a final layer of the NN model 110 may receive inputs from at least one previous layer. A number of layers and a number of nodes in each layer may be determined from a network topology and certain hyper-parameters of the NN model 110. Such hyper-parameters may be set before or while training the NN model 110 on a training dataset of image frames.

Each node in the NN model 110 may correspond to a mathematical function with a set of parameters, tunable when the NN model 110 is trained. These parameters may include, for example, a weight parameter, a regularization parameter, and the like. Each node may use the mathematical function to compute an output based on one or more inputs from nodes in other layer(s) (e.g., previous layer(s)) of the NN model 110. Examples of the NN model 110 may include, but are not limited to, a convolutional neural network (CNN) model, a fully convolutional network (FCN) model, a long-short term memory (LSTM)-CNN hybrid network model, Regions with CNN (R-CNN) model, Fast R-CNN model, Faster R-CNN model, a You Only Look Once (YOLO) network model, a Residual Neural Network (Res-Net) model, a Feature Pyramid Network (FPN) model, a Retina-Net, a Single Shot Detector (SSD) model, and/or a variant thereof.

In an embodiment, the NN model 110 may include electronic data, which may be implemented as, for example, a software component of an application executable on the electronic apparatus 102. The NN model 110 may rely on libraries, external scripts, or other logic/instructions for execution by a processing device, such as the electronic apparatus 102. Additionally, or alternatively, the NN model 110 may be implemented using hardware, such as a processor, a co-processor (such as an inference accelerator chip), a microprocessor (e.g., to perform or control performance of one or more operations), a field-programmable gate array (FPGA), or an application-specific integrated circuit (ASIC). In some embodiments, the NN model 110 may be implemented using a combination of both the hardware and the software program.

In training of the NN model 110, one or more parameters of each node of the NN model 110 may be updated based on whether an output of the final layer for a given input (e.g., a training dataset of cropped license plate images) matches a correct result based on a loss function for the NN model 110. The above process may be repeated for same or a different input until a minima of loss function is achieved, and a training error is minimized. Several methods for training are known in the art, for example, gradient descent, stochastic gradient descent, batch gradient descent, gradient boost, meta-heuristics, and the like.

Once trained, the NN model 110 may be configured to be deployed on the electronic apparatus 102. The NN model 110 may be trained for a License Plate Detection (LPD) task and/or a License Plate Recognition (LPR) task to detect license plates in images and/or to recognize the license plate numbers on such license plates, respectively of the one or more second vehicles present in a vicinity to the first vehicle 104.

The communication network 112 may include a communication medium through which the electronic apparatus 102, and each of the plurality of image capture devices 106 may communicate with each other. Examples of the communication network 112 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 112, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols. In some embodiments, the communication network 112 may be an in-vehicle network or a peer-to-peer vehicle-to-everything (V2X) network. The communication network 112 may rely of vehicle communication protocols and standards to communication with different in-vehicle electronics or devices (such as the one or more second vehicles or roadside units) in a communication range of the first vehicle 104.

In operation, the electronic apparatus 102 associated with the first vehicle 104 may control the first image capture device 106A (or the second image capture device 106B) of the plurality of image capture devices 106 to capture the one or more images 114 of the second vehicle 108A which may be positioned (such as in movement) close to the position of the first vehicle 104, as shown in FIG. 1. For example, the one or more images 114 of the second vehicle 108A may be captured while the first vehicle 104 is moving and the second vehicle 108A is in a first field-of-view (FoV) of first image capture device 106A. Once the one or more images 114 have been captured, the first image capture device 106A may be configured to transfer the captured one or more images 114 of the second vehicle 108A to the electronic apparatus 102. In case the electronic apparatus 102 is installed in the first vehicle 104, the one or more images 114 may be transferred wirelessly or wired through a suitable camera interface or an in-vehicle communication network. In case the electronic apparatus 102 is a remote computing device, the one or more images 114 may be transferred via the communication network 112.

The electronic apparatus 102 may receive the captured one or more images 114 and may detect the license plate 116 of the second vehicle 108A in the captured one or more images 114. In an embodiment, the electronic apparatus 102 may apply the trained NN model 110 on the one or more of images 114. The NN model 110 may sequentially receive one or each of the one or more images 114 as an input through an input layer of the NN model 110 and may output one or more license plate detection (LPD) results to the electronic apparatus 102. Each LPD result in the one or more LPD results may correspond to an image in the input one or more images 114. In some embodiments, each LPD result may include, for example, bounding box coordinates and an LPD confidence score. For each input image, the bounding box coordinates (bx, by, bw, bh) may define a window portion of the respective input image in which the license plate 116 of the second vehicle 108A is detected. The LPD confidence score may be a soft label (i.e. between 0 and 1) or a hard label (i.e. 0 or 1). If the LPD confidence score is high (i.e. close to 1), then the likelihood of the license plate 116 within the bounding box coordinates is high. If the LPD confidence score is low (i.e. close to 0), then the likelihood of the license plate 116 within the bounding box coordinates is low (with a degree to uncertainty).

In another embodiment, the NN model 110 may output one or more license plate recognition (LPR) results, where each LPR result may correspond to an image in the input one or more images 114. Each LPR result may include a license plate number of the second vehicle 108A and an LPR confidence score indicative of a confidence of the NN model 110 in the recognition of the license plate number. Similar to the LPD confidence score, the LPR confidence score may be a soft label (i.e. between 0 and 1) or a hard label (i.e. 0 or 1). The LPR confidence score may be a single value for the entire license plate number or may be a vector of confidence scores, where each element of the vector includes a confidence score for one of the characters of the license plate number. If the LPR confidence score is high (i.e. close to 1), then the recognition accuracy of the license plate number within the bounding box coordinates is high. If the LPR confidence score is low (i.e. close to 0), then the recognition accuracy of the license plate number within the bounding box coordinates is low (with a degree to uncertainty).

The electronic apparatus 102 may be further configured to extract the one or more LPD results as the output of the NN model 110 for the input one or more images 114 of the second vehicle 108A. The electronic apparatus 102 may detect the license plate 116 of the second vehicle 108A in each image of the input one or more images 114 based on the extracted one or more LPD results. From the input one or more images 114, the electronic apparatus 102 may extract a set of detected license plates 118 (shown in FIG. 1), each of which may correspond to the detected license plate of the second vehicle 108A. For example, the electronic apparatus 102 may select a set of images from the input one or more images 114 and from each of the selected set of images, the set of detected license plates 118 may be extracted by cropping a region of interest (ROI) which lies within the bounding box coordinates, as included in a respective LPD result of the extracted one or more LPD results.

The set of detected license plates 118 may include at least a first license plate 118A (also referred as a first license plate 118A). As shown, the set of detected license plates 118 may also include a second license plate 118B (either same or different than the first license plate 118A). The electronic apparatus 102 may further determine a depth map of the first license plate 118A of the second vehicle 108A of the one or more second vehicles 108A with respect to the first vehicle 104. The depth map may indicate information related to a distance of the first license plate 118A from the first image capture device 106A installed on the first vehicle 104. The one or more images 114 of the second vehicle 108A, from which the first license plate 118A may be detected, may be captured by the first image capture device 106A. In some embodiments, the real dimension of the detected first license plate 118A may be fixed as per a geo-location of the first vehicle 104 or the second vehicle 108A. The electronic apparatus 102 may extract a dimension in pixels of the first license plate 118A from the captured one or more images 114. The electronic apparatus 102 may further determine the depth map based on the real dimension and the dimensions in pixels of the detected first license plate 118A. The details of the calculation of the depth map of the first license plate 118A of the second vehicle 108A are further provided, for example, in FIG. 3. In an embodiment, the electronic apparatus 102 may determine a position of the second vehicle 108A with respect to the first vehicle 104 based on analysis of pixel information about the second vehicle 108A in the captured one or more images 114 and/or based on the determined depth map.

The electronic apparatus 102 may further detect one or more events related to the second vehicle 108A based on the determined distance of the second vehicle 108A from the first vehicle 104 or based on the determined depth map. In some embodiments, the electronic apparatus 102 may compare the determined distance with a minimum threshold distance (in meters, feet, or yards) and detect the one or more events related to the second vehicle 108A only if the determined distance is less than the minimum threshold distance. The minimum threshold distance may correspond to a minimum distance that may be maintained between any two vehicles moving on the road, for the safety of one or more passengers travelling in the first vehicle 104 and the second vehicle 108A as well as for the safety of the vehicles and nearby property. The details about the one or more events are provided, for example, in FIGS. 3, 4A, 4B, 4C, 5A, and 5B.

The detected one or more events may include, but is not limited to, a stop event, an over-take event, an approaching event, a collision event, an over-speeding event. In an embodiment, the electronic apparatus 102 may further estimate time of the one or more events related to the second vehicle 108A based on the determined depth map and/or based on the position of the second vehicle 108A with respect to the first vehicle 104. The electronic apparatus 102 may further control one or more operations of the first vehicle 104 based on the estimated time of the one or more events related to the second vehicle 108A. The one or more operations may correspond to one of a braking operation, an acceleration operation, a lane change operation, a turning operation, an alert or warning operation, or a stop operation. Details of the control of one or more operations of the first vehicle 104 are further provide, for example, in FIGS. 3, 4A, 4B, 4C, 5A, and 5B. Therefore, the disclosed electronic apparatus may control the operations of the first vehicle 104 based on the detection or tracking of events of the second vehicle 108A using inexpensive image capture devices and license plate detection/recognition (for example using NN model 110), as compared to using expensive LiDAR sensors or expensive communication resources. Therefore, based on the license plate detection/recognition, the disclosed electronic apparatus may provide the first vehicle 104 an inexpensive and real-time fleet management of nearby second vehicles, and may be widely implemented in all the autonomous or non-autonomous vehicles spanning over a variety of price range.

Figure 2:
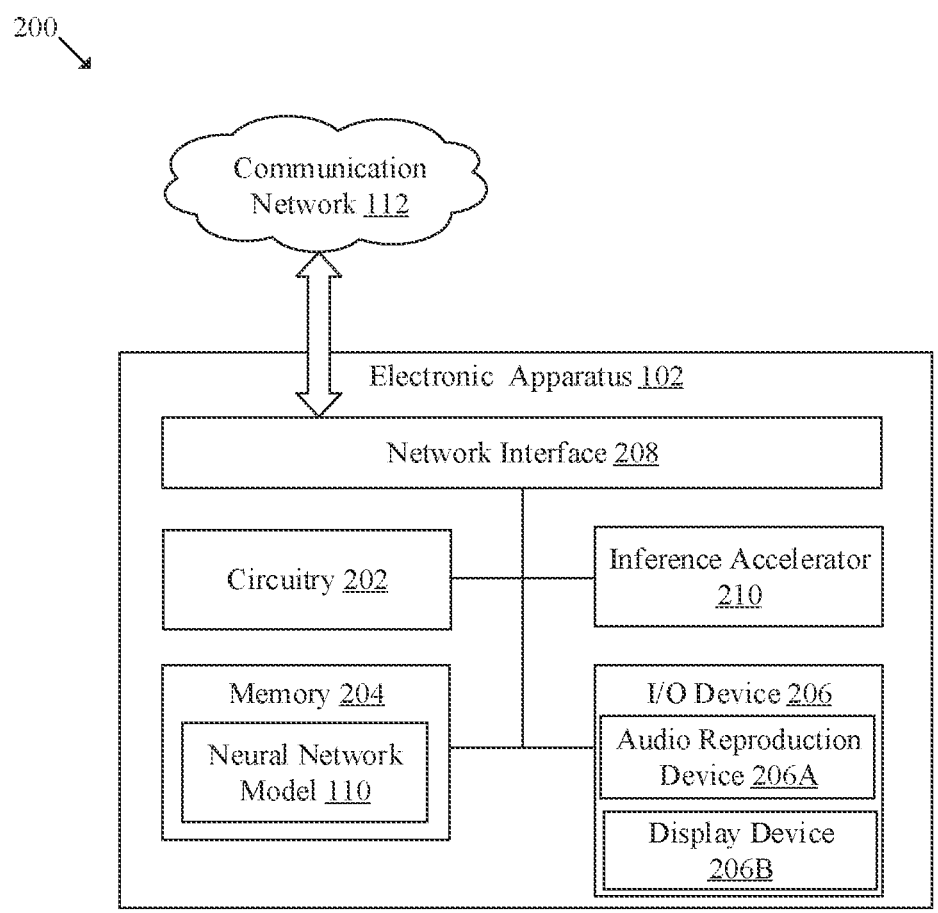
FIG. 2 is an exemplary block diagram of the electronic apparatus of FIG. 1, in accordance with an embodiment of the disclosure.

FIG. 2 is an exemplary block diagram of the electronic apparatus of FIG. 1, in accordance with an embodiment of the disclosure. FIG. 2 is explained in conjunction with elements from FIG. 1. With reference to FIG. 2, there is shown a block diagram 200 of the electronic apparatus 102. The electronic apparatus 102 may include circuitry 202, a memory 204, an input/output (I/O) device 206, and a network interface 208. The memory 204 may include the neural network (NN) model 110. In some embodiments, the electronic apparatus 102 may include an inference accelerator 210 to accelerate operations associated with the NN model 110. In such an implementation, the NN model 110 may rely on storage and computing resources of the memory 204 and the inference accelerator 210.

The circuitry 202 may be communicatively coupled to the memory 204, the I/O device 206, the network interface 208, and the inference accelerator 210. In at least one embodiment, the electronic apparatus 102 may include provisions to capture the one or more images 114 of the one or more second vehicles via the plurality of image capture devices 106 and apply certain operations on the captured one or more images 114.

The circuitry 202 may include suitable logic, circuitry, interfaces, and/or code that may be configured to execute program instructions associated with different operations to be executed by the electronic apparatus 102. For example, one or more of such operations may be executed to control the first vehicle 104 based on the detected one or more events related to the second vehicle 108A (i.e. present in the vicinity to the first vehicle 104). The circuitry 202 may be implemented based on a number of processor technologies known in the art. Examples of implementations of the circuitry 202 may be a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or a combination thereof.

The memory 204 may include suitable logic, circuitry, and/or interfaces that may be configured to store the program instructions executable by the circuitry 202. Additionally, the memory 204 may store the captured the one or more images 114 of the one or more second vehicles. In at least one embodiment, the memory 204 may store the NN model 110. The memory 204 may be further configured to store the first set of parameters associated with each of the plurality of image capture devices 106. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and/or interfaces that may be configured to act as an I/O channel/interface between the electronic apparatus 102 and a user of the electronic apparatus 102. The I/O device 206 may include various input and output devices, which may be configured to communicate with different operational components of the electronic apparatus 102. Examples of the I/O device 206 may include, but are not limited to, a keyboard, a mouse, a joystick, a microphone, an audio reproduction device 206A, and a display device 206B.

The audio reproduction device 206A may include suitable logic, circuitry, and interfaces that may be configured to playback an audio output (for example an audio alert or warning) related to the detected one or more events. In one or more embodiments, the audio reproduction device 206A may be configured to playback an audio output related to the one or more operations of the first vehicle 104 to be controlled. The audio reproduction device 206A may be configured to receive electrical audio signals from the circuitry 202 and convert the received electrical audio signals into the audio/sound output. In some embodiments, the audio reproduction device 206A may be integrated with electronic apparatus 102 and may be an internal component of the electronic apparatus 102. In some embodiments, the audio reproduction device 206A may be positioned anywhere within the first vehicle 104. Examples of the audio reproduction device 206A may include, but are not limited to, a loudspeaker, a woofer, a sub-woofer, a tweeter, a wireless speaker, a monitor speaker, or other speakers or sound output device.

The display device 206B may include suitable logic, circuitry, and interfaces that may be configured to display a warning or alert related to the detected one or more events related to the second vehicle 108A and/or the one or more operations of the first vehicle 104. In some embodiments, the display device 206B may be a touch screen. The touch screen may be at least one of a resistive touch screen, a capacitive touch screen, or a thermal touch screen. The display device 206B may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 206B may refer to a display screen of a head mounted device (HMD), a smart-glass device, a see-through display, a projection-based display, an electro-chromic display, or a transparent display. In some embodiments, the display device 206B may be positioned anywhere within the first vehicle 104, for example at a dashboard of the first vehicle 104 or at in-vehicle infotainment system of the first vehicle 104.

The network interface 208 may include suitable logic, circuitry, interfaces, and/or code that may be configured to connect and communicate with a plurality of electronic devices, such as a computer, a smartphone, or a server. The electronic apparatus 102 may communicate with the plurality of image capture devices 106 via the network interface 208. The network interface 208 may be configured to implement known technologies to support wired or wireless communication. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 208 may be configured to communicate via offline and online wireless communication networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The inference accelerator 210 may include suitable logic, circuitry, interfaces, and/or code that may be configured to operate as a co-processor for the circuitry 202 to accelerate computations associated with the operations of the NN model 110 for the LPD task and/or the LPR task. The inference accelerator 210 may accelerate the computations on the electronic apparatus 102 such that the one or more LPD results or the one or more LPR results is generated in less time than what is typically incurred without the use of the inference accelerator 210. The inference accelerator 210 may implement various acceleration techniques, such as parallelization of some or all of the operations of the NN model 110. The inference accelerator 210 may be implemented as a software, a hardware, or a combination thereof. Example implementations of the inference accelerator 210 may include, but are not limited to, a GPU, a Tensor Processing Unit (TPU), a neuromorphic chip, a Vision Processing Unit (VPU), a field-programmable gate arrays (FGPA), a Reduced Instruction Set Computing (RISC) processor, an Application-Specific Integrated Circuit (ASIC) processor, a Complex Instruction Set Computing (CISC) processor, a microcontroller, and/or a combination thereof.

The functions or operations executed by the electronic apparatus 102, as described in FIG. 1, may be performed by the circuitry 202. Operations executed by the circuitry 202 are described in detail, for example, in FIGS. 3, 4A, 4B, 4C, 5A, and 5B.

Figure 3:
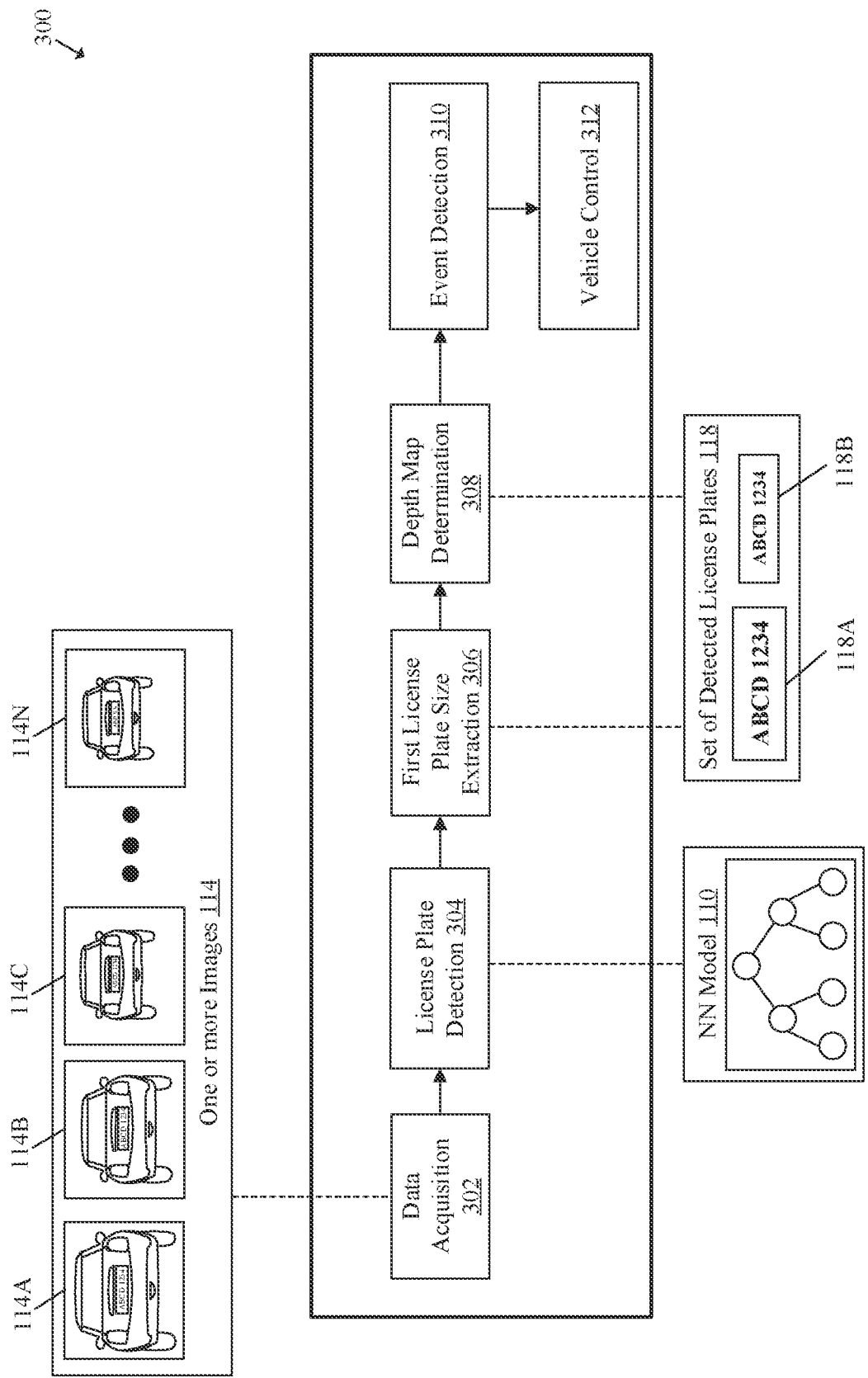
FIG. 3 is a diagram that illustrates exemplary operations for license plate recognition-based vehicle control, in accordance with an embodiment of the disclosure.

FIG. 3 is a diagram that illustrates exemplary operations for license plate recognition-based vehicle control, in accordance with an embodiment of the disclosure. FIG. 3 is explained in conjunction with elements from FIG. 1 and FIG. 2. With reference to FIG. 3, there is shown a block diagram 300 that illustrates exemplary operations from 302 to 312, as described herein. The exemplary operations illustrated in the block diagram 300 may start at 302 and may be performed by any computing system, apparatus, or device, such as by the electronic apparatus 102 of FIG. 1 or FIG. 2. Although illustrated with discrete blocks, the exemplary operations associated with one or more blocks of the block diagram 300 may be divided into additional blocks, combined into fewer blocks, or eliminated, depending on the particular implementation.

At 302, a data acquisition operation may be performed. In the data acquisition operation, the circuitry 202 may control the first image capture device 106A (or the second image capture device 106B or other image capture devices) of the plurality of image capture devices 106 to capture the one or more images 114 of the one or more second vehicles different from the first vehicle 104. The one or more second vehicles may be positioned or moving around the first vehicle 104 (as shown in FIG. 1). In other words, the one or more second vehicles may lie within a predetermined distance (such as in meters, feets, or yards) from the first vehicle 104. Each of the plurality of image capture devices 106 may be installed in the first vehicle 104. Each of the plurality of image capture devices 106 may be calibrated to include a license plate (such as the license plate 116) of a second vehicle (such as the second vehicle 108A) in the field-of-view (FOV) of the corresponding image capture device. As shown, the captured one or more images 114 may include, but is not limited to, the first image 114A, the second image 114B, the third image 114C, and/or the Nth image 114N of the second vehicle 108A or the license plate 116 of the second vehicle 108A. Once captured, the first image capture device 106A may transfer the captured one or more images 114 to the electronic apparatus 102. In some embodiments, the different image capture devices of the plurality of image capture devices 106 are controlled by the circuitry 202 to capture one or more images 114 of the surrounding of the first vehicle 104. The circuitry 202 may send different commands to the plurality of image capture devices 106 to capture one or more images 114. The circuitry 202 may receive one or more images 114 from at one image capture device (such as the first image capture device 106A) which may include the images of the second vehicle 108A which may be in a vicinity to the first vehicle 104. Based on the change in the movement of the second vehicle 108A around the first vehicle 104 and based on a speed of capture of the first image capture device 106A, a size in pixel of the second vehicle 108A may be different in the one or more images 114, as shown in FIG. 3.

At 304, license plate detection (LPD) operation may be performed. In the LPD operation, the circuitry 202 may be configured to detect the license plate 116 of the second vehicle 108A in the captured one or more images 114. In an embodiment, the circuitry 202 may input the captured one or more images 114 of the second vehicle 108A to the NN model 110. The NN model 110 may be an automatic license plate recognition (ALPR) network that may be pre-trained on the LPD task and/or the LPR task. In an embodiment, the NN model 110 may sequentially receive each of the one or more images 114 as an input and may output the one or more LPD results. Each LPD result in the output one or more LPD results may correspond to an image or sub-image in the input one or more images 114. Each LP result may include, for example, bounding box coordinates and an LPD confidence score. For each input image, the bounding box coordinates (bx, by, bw, bh) may define a window portion of the respective input image in which the license plate 116 of the second vehicle 108A is detected. The LPD confidence score may be a soft label (i.e. between 0 and 1) or a hard label (i.e. 0 or 1). If the LPD confidence score is high (i.e. close to 1), then the likelihood of the license plate 116 within the bounding box coordinates is high. If the LPD confidence score is low (i.e. close to 0), then the likelihood of the license plate 116 within the bounding box coordinates is low (with a degree to uncertainty).

In another embodiment, the NN model 110 may output the one or more LPR results, where each LPR result may correspond to an image or sub-image in the input one or more images 114. Each LPR result may include a license plate number of the second vehicle 108A and an LPR confidence score indicative of a confidence of the NN model 110 in the recognition of the license plate number. Similar to the LPD confidence score, the LPR confidence score may be a soft label (i.e. between 0 and 1) or a hard label (i.e. 0 or 1). The LPR confidence score may be a single value for the entire license plate number or may be a vector of confidence scores, where each element of the vector includes a confidence score for one of the characters of the license plate number. If the LPR confidence score is high (i.e. close to 1), then the recognition accuracy of the license plate number within the bounding box coordinates is high. If the LPR confidence score is low (i.e. close to 0), then the recognition accuracy of the license plate number within the bounding box coordinates is low (with a degree to uncertainty).

The circuitry 202 may extract the one or more LPD results as an output of the NN model 110 for the input one or more images 114 and may detect the license plate 116 of the second vehicle 108A based on the extracted one or more LPD results. In an embodiment, the electronic apparatus 102 may extract a set of detected license plates 118 of the second vehicle 108A from the one or more images 114 of the second vehicle 108A, using the NN model 110. The size in pixels of the license plates (or bounding boxes) in the set of detected license plates 118 may vary (as shown in FIG. 3) based on movement of the first vehicle 104 and the second vehicle 108A. In an embodiment, the circuitry 202 may also extract the one or more LPR results, based on which the license plate number of the second vehicle 108A that may be recognized in the input one or more images 114.

At 306, a first license plate size extraction operation may be performed. In the first license plate size extraction operation, the electronic apparatus 102 may be configured to extract a first size of the license plate 116 of the second vehicle 108A. The first size may be extracted based on a geo-location of at least one of the first vehicle 104 or the second vehicle 108A. The first size (as length and height) may be a standard or fixed size of each license plate for each vehicle registered in a particular geo-location area and may be standardized by a government authority or a non-government authority. By way of example, the first size of each license plate of each vehicle in Washington, D.C, may be 12 inches×6 inches. The first size may be a real size of detected license plate. It may be noted that the first size of the license plate may vary in different geo-locations. The geo-location of at least one of the first vehicle 104 or the second vehicle 108A may be received via one or more location sensors installed in the first vehicle 104 (and/or the second vehicle 108A) and may include a sequence of location values of the first vehicle 104 (and/or the second vehicle 108A) at regular time intervals. Examples of the location sensor may include, but are not limited to, a Global Navigation Satellite System (GNSS) receiver, a mobile network-based locator (such as a Subscriber Identity Module), and/or a combination thereof. Examples of the GNSS-based receiver/sensor may include, but are not limited to, global positioning sensor (GPS), Global Navigation Satellite System (GLONASS), or other regional navigation systems or sensors. In some embodiments, the location sensor may further include an inertial measurement unit, an accelerometer, or a gyroscope to track relative motions. In some other embodiments, the electronic apparatus 102 may receive the current geo-location of the first vehicle 104 or the second vehicle 108A from a navigation server (not shown) and accordingly retrieve or determine the first size of the license plate 116 based on the current geo-location. In some embodiments, the electronic apparatus 102 may retrieve the first size (i.e. real size) of the license plate 116 from the memory 204 or from the navigation server (or from a server associated with a transport authority).

At 308, a depth map determination operation may be performed. In the depth map determination operation, the electronic apparatus 102 may be configured to determine a depth map or a change in the depth map of a first license plate 118A of the second vehicle 108A of the one or more second vehicles, with respect to the first vehicle 104. In an embodiment, the depth map may correspond to a distance between the first image capture device 106A installed in the first vehicle 104 and the detected first license plate 118A of the second vehicle 108A. In some embodiments, the depth map may be indicative of the distance between the first vehicle 104 and the second vehicle 108A. The depth map may indicate a plurality of distance values between a position of the first image capture device 106A and different positions (i.e. edges or surfaces) of the detected first license plate 118A of the second vehicle 108A.

To determine the depth map of the detected first license plate 118A with respect to the first vehicle 104, the electronic apparatus 102 may be configured to determine a pixel size of the detected first license plate 118A of the second vehicle 108A in the captured one or more images 114. The pixel size of the detected first license plate 118A may correspond to a size (length and/or height) of the detected first license plate 118A of the second vehicle 108A in pixels. The electronic apparatus 102 may further retrieve the stored first set of parameters associated with the first image capture device 106A. The first set of parameters may include, but is not limited to, a focal length, a resolution, or an image sensor length/height of the first image capture device 106A during the capture of the one or more images 114 of the second vehicle 108A. The depth map may be determined based on the extracted first size (real-size), and the determined pixel size of the first license plate 118A. For example, the electronic apparatus 102 may determine the distance (indicating depth map) between the first license plate 118A and the first image capture device 106A based on a ratio of the extracted first size and the determined pixel size. In some embodiments, the electronic apparatus 102 may determine the distance (indicating depth map) between the first license plate 118A and the first image capture device 106A based on the extracted first size, the determined pixel size, and the first set of parameters related to the first image capture device 106A.

The electronic apparatus 102 may further store the determined depth map (or the distance) of the detected first license plate 118A with respect to the first vehicle 104 in the memory 204. It may be noted that the computation of the depth map of the detected first license plate 118A based on the extracted first size (i.e. real dimension) and the pixel size (i.e. determined from the captured one or more images 114) may be efficient and/or cost effective, in comparison to using expensive LIDARs on the first vehicle 104 or using expensive communication resources.

In some other embodiments, the electronic apparatus 102 may be configured to determine a first font size (in pixel) of one or more license plate characters of the detected first license plate 118A of the second vehicle 108A from an image (for example the first image 114A) of the captured one or more images 114. By way of example and not limitation, the one or more license plate characters of the detected first license plate 118A may correspond to "ABCD 1234", as shown in FIG. 3.

The electronic apparatus 102 may be further configured to determine a second font size in pixel of the one or more license plate characters of the detected license plate (such as a second license plate 118B) of the same second vehicle 108A from the second image 114B of the captured one or more images 114. The first image 114A (i.e. based on which the first license plate 118A may be detected) and the second image 114B (i.e. based on which the second license plate 118B) may be captured by the first image capture device 106A of the plurality of image capture devices 106. It may be noted that the first license plate 118A and the second license plate 118B of the second vehicle 108A are the same license plate physically, but may vary in terms of size or orientation based on the capture of the moving second vehicle 108A, movement of the first vehicle 104, and/or the capture speed of the first image capture device 106A installed on the first vehicle 104.

The electronic apparatus 102 may further compare the determined first font size in pixel of the one or more license plate characters of the second vehicle 108A with the determined second font size in pixel of the one or more license plate characters of the second vehicle 108A. The electronic apparatus 102 may further determine a change in the depth map further based on the comparison (i.e. change in font size in pixel of the license plate characters). In an embodiment, the determined first font size in pixel of the one or more license plate characters of the second vehicle 108A may be greater than the determined second font size in pixel of the one or more license plate characters of the second vehicle 108A. In such case where the first image 114A is captured earlier than the second image 114B, the change in the depth map may be indicative of an increase in the determined distance. In another embodiment, the determined first font size in pixel of the one or more license plate characters of the second vehicle 108A may be lesser than the determined second font size in pixel of the one or more license plate characters of the second vehicle 108A. In such case, the change in the depth map may be indicative of a decrease in the distance between the second vehicle 108A and the first image capture device 106A.

In another embodiment, the electronic apparatus 102 may be further configured to determine a first size (in pixel) of the first license plate 118A of the second vehicle 108A in the first image 114A of the captured one or more images 114. The first size in pixels may refer to the pixel size of the first license plate 118A. The electronic apparatus 102 may further determine a second size (in pixel) of the first license plate 118A of the second vehicle 108A in the second image 114B of the captured one or more images 114. The second image 114B may be captured later than the capture of the first image 114A of the license plate of the second vehicle 108A, by the first image capture device 106A on the first vehicle 104. The electronic apparatus 102 may further compare the determined first size in pixel with the determined second size in pixel and further determine a speed of the second vehicle 108A with respect to a speed of the first vehicle 104 based on the comparison. Therefore, the disclosed electronic apparatus 102 may be capable to determine the speed of the second vehicle 108A in the vicinity of the first vehicle 104 based on the determination of the size (in pixels) of the detected license plate of the second vehicle 108A.

In accordance with an embodiment, the circuitry 202 of the electronic apparatus 102 may be configured to compare the determined speed of the second vehicle 108A with a legal maximum speed and/or a legal minimum speed set by the government/authorities for a particular geo-zone or a road at which the second vehicle 108A and the first vehicle 104 may be present. The legal maximum speed may correspond to a maximum speed at which the first vehicle 104 or each of the one or more second vehicles may be allowed to move on the road or in the geo-zone, and the legal maximum speed may correspond to a minimum speed at which the first vehicle 104 or each of the one or more second vehicles may be allowed to move on the road or in the geo-zone. In case the determined speed of the second vehicle 108A is less than the legal minimum speed or greater than the legal maximum speed, the electronic apparatus 102 may inform traffic enforcement department about the violation of the legal minimum speed or the legal maximum speed. Therefore, in addition to the control of the operations (i.e. described, for example, at 312 in FIG. 3) of the first vehicle 104, the electronic apparatus 102 may also help in enforcement traffic laws in the geo-zone.

In another embodiment, the electronic apparatus 102 may be further configured to determine a change in at least one of a distance between the second vehicle 108A and the first vehicle 104, a position of the second vehicle 108A with respect to the first vehicle 104 or a speed to the second vehicle 108A with respect to the first vehicle 104 based on the determined change in the depth map or the distance, identified based on the real-time detection of the license plate of nearby vehicles (such as the second vehicle 108A).

At 310, an event detection operation may be performed. In the event detection operation, the electronic apparatus 102 may be configured to detect one or more events related to the second vehicle 108A based on the determined depth map or based on the determined change in the depth map. The one or more events may include, but is not limited to, a stop event, an over-take event, an approaching event, or a collision event. The details about the detection of one or more events related to the second vehicle 108A are provided, for example, in FIGS. 4A, 4B, 4C, 5A, and 5B.

At 312, a vehicle control operation may be performed. In the vehicle control operation, the electronic apparatus 102 may be configured to control one or more operations of the first vehicle 104 based on the detected one or more events related to the second vehicle 108A. The one or more operations of the first vehicle 104 may correspond to one of a braking operation, an acceleration operation, a lane change operation, a turning operation, an alert or warning operation, or a stop operation. The electronic apparatus 102 may be configured to transmit one or more control instructions to an electronic control unit (ECU) or to in-vehicle controller of the first vehicle 104 to control one or more operations of the first vehicle 104. Details about the control of one or more operations of the first vehicle 104 based on the detected one or more events related to the second vehicle 108A are provided, for example, in FIGS. 4A, 4B, 4C, 5A, and 5B.

In accordance an embodiment, the electronic apparatus 102 may be configured to construct a three-dimensional (3D) structure of the detected first license plate 118A of the second vehicle 108A based on the captured one or more images 114 and the determined depth map. The electronic apparatus 102 may construct the 3D structure of the first license plate 118A of the second vehicle 108A based on color information (i.e. RGB information) in the captured one or more images 114 and based on the determined depth map which may indicate different distances values between the first image capture device 106A and various points on the surface/edges of the first license plate 118A. In some embodiments, the electronic apparatus 102 may control multiple image capture devices (i.e. that may provide stereo vision) at a time to capture a three-dimensional image of the second vehicle 108A or the license plate 116. Based on the constructed 3D structures of nearby vehicles or corresponding license plates, the electronic apparatus 102 associated with the first vehicle 104 may accurately determine different parameters (for example, but not limited to, distance, size, or position) related to the nearby vehicles with respect to the first vehicle 104, and effectively determine the one or more events related to the nearby vehicles (such as the second vehicle 108A) and timely control different operations (i.e. alerts, turn left/right, apply brakes, or acceleration/deacceleration) of the first vehicle 104.

In another embodiment, the electronic apparatus 102 may be configured to estimate time of the one or more events related to the second vehicle 108A based on the determined depth map. The electronic apparatus 102 may further control the one or more operations of the first vehicle based on the constructed 3D structure of the first license plate 118A and/or based on the estimated time of the one or more events related to the second vehicle 108A. In one or more embodiments, based on the estimated time of the one or more events, the electronic apparatus 102 may be configured to output the warning (i.e. audibly or visually) to an occupant of the first vehicle 104 via the audio reproduction device 206A and/or the display device 206B, before the control of the one or more operations of the first vehicle 104. For example, the estimate time may indicate that the second vehicle 108A may collide (i.e. event) with the first vehicle 104 in next 3 seconds based on the determined depth map, constructed 3D structure, or the determined speed of the second vehicle 108A or speed of the first vehicle 104. The warning (for example an early crash warning) may alert the occupant of the first vehicle 104 about the control of the one or more operations of the first vehicle 104 based on the detected one or more events of the second vehicle 108A or the estimated time of the one or more events. The details about the control of the one or more operations of the first vehicle 104 are provided, for example, in FIGS. 4A, 4B, 4C, 5A, and 5B. Therefore, the disclosed electronic apparatus may be capable to manage a fleet of vehicles (i.e. second vehicle 108A) in the vicinity of the first vehicle 104, based on real-time tracking of one or more events of each vehicle in the vicinity of the first vehicle 104 using license plate detection (LPD). In some embodiments, the disclosed electronic apparatus may also assist a novice driver of the first vehicle 104 based on the control of the one or more operations of the first vehicle 104, thereby to minimize a probability of an accident or a casualty.

Figure 4A:
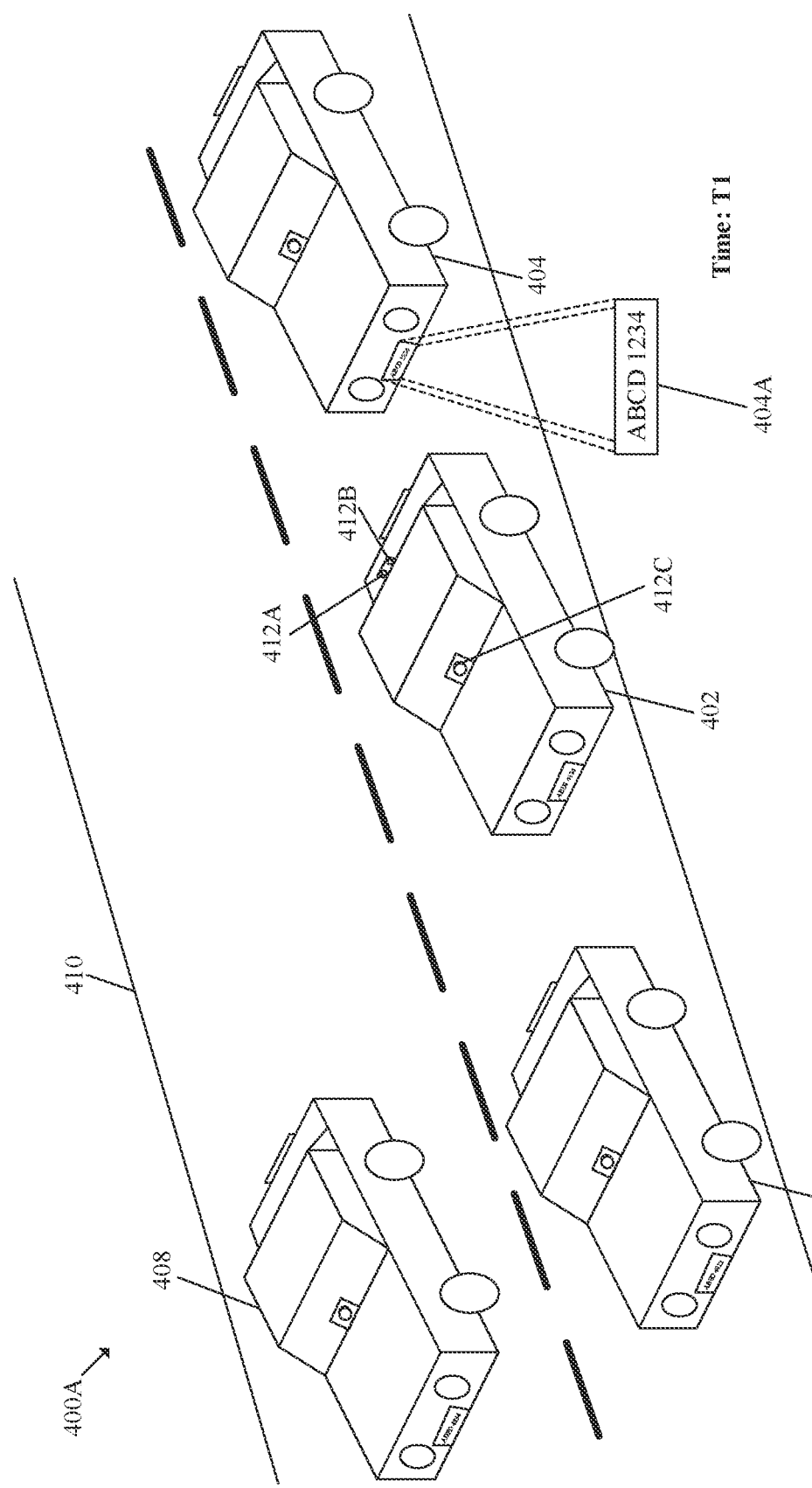
FIGS. 4A, 4B, and 4C, collectively depicts an exemplary first scenario for license plate recognition-based vehicle control, in accordance with an embodiment of the disclosure.
Figure 4B:
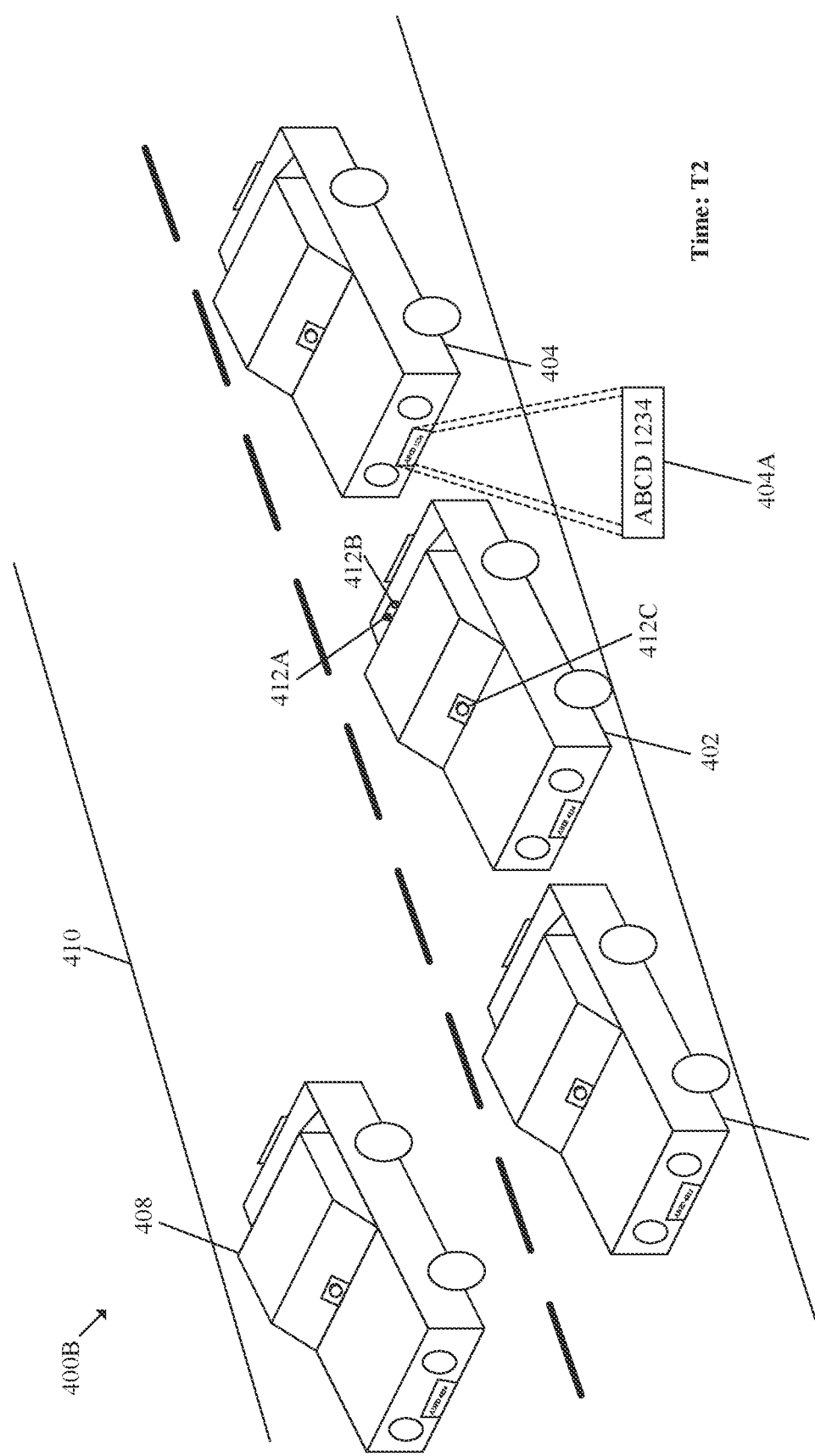
Figure 4C:
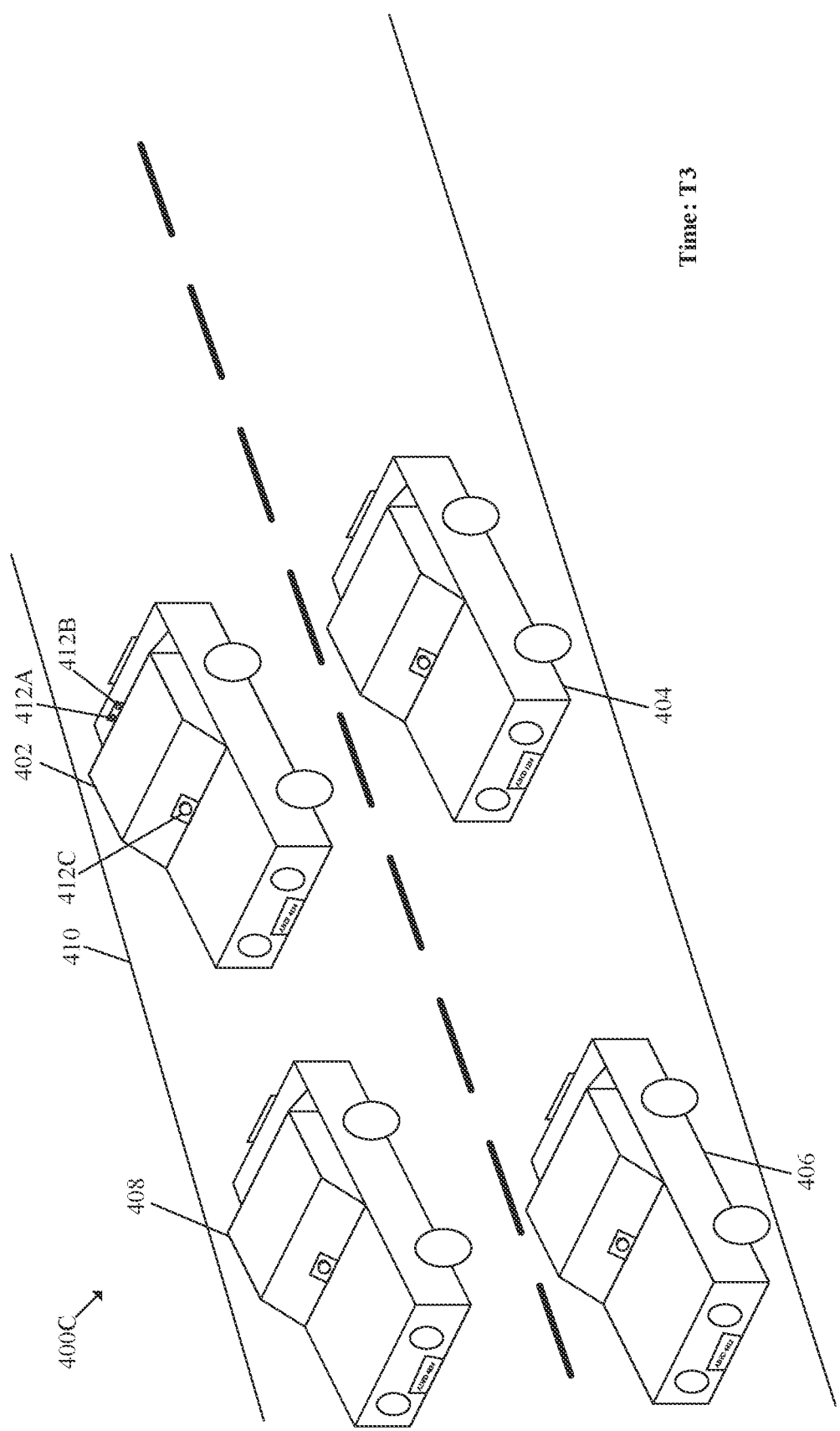

FIGS. 4A, 4B, and 4C, collectively depicts an exemplary first scenario for license plate recognition-based vehicle control, in accordance with an embodiment of the disclosure. FIGS. 4A, 4B, and 4C are explained in conjunction with elements from FIGS. 1, 2, and 3. With reference to FIGS. 4A, 4B, and 4C, there is shown a first scenario 400A at time "T1", a second scenario 400B at time "T2", and a third scenario 400C at time "T3", respectively. With reference to FIGS. 4A, 4B, and 4C, there is shown a first vehicle 402, a second vehicle 404, a third vehicle 406, and a fourth vehicle 408. Each vehicle may be moving on a road 410.

At time "T1", for example, the second vehicle 404 may have a license plate 404A with the license plate characters "ABCD 1234", and the second vehicle 404 may be behind the first vehicle 402 as shown in FIG. 4A. The third vehicle 406 and the fourth vehicle 408 may be positioned ahead of the first vehicle 402 as shown, for example, in FIG. 4A. The second vehicle 404, the third vehicle 406, and the fourth vehicle 408 may be included as one or more second vehicles (i.e. described in FIGS. 1 and 3). A plurality of image capture devices may be installed on the first vehicle 402. The plurality of image capture devices 412 (i.e. similar to the plurality of image capture devices 106) may include a first image capture device 412A, a second image capture device 412B, and a third image capture device 412C. In some embodiments, the plurality of image capture devices may be installed on each vehicle of the one or more second vehicles at different positions of respective vehicle.

At time "T1", the circuitry 202 may control the first image capture device 412A to capture one or more images of the one or more second vehicles (for example the second vehicle 404) different from the first vehicle 402. The circuitry 202 may further apply the neural network (NN) model 110 on each of the captured one or more images and detect the license plate 404A of the second vehicle 404 based on the application of the NN model 110 on each of the captured one or more images as described, for example, at FIGS. 1 and 3.

The circuitry 202 may determine a first depth map of the detected license plate 404A of the second vehicle 404 of the one or more second vehicles with respect to the first vehicle 402. The details about the determination of the first depth map are provided, for example in FIG. 3. The determined first depth map may be indicative of a first distance between the second vehicle 404 and the first vehicle 402 (or the first image capture device 412A which captured the images of the second vehicle 404 as shown in FIG. 4A).

In some embodiments, the circuitry 202 may be further configured to control the third image capture device 412C to capture one or more images of the third vehicle 406 and the fourth vehicle 408 shown in FIG. 4A. In another example, an image capture device (not shown) positioned on a side of the first vehicle 402 may capture the images of the fourth vehicle 408. The circuitry 202 may further detect a license plate of each of the third vehicle 406 and the fourth vehicle 408 as described, for example, in FIG. 3. The circuitry 202 may be further configured to determine a second depth map of the detected license plate (not shown) of the third vehicle 406 of the one or more second vehicles with respect to the first vehicle 402. The determined second depth map may be indicative of a second distance between the third vehicle 406 and the first vehicle 402 (or the third image capture device 412C). The circuitry 202 may further determine a third depth map of the detected license plate of the fourth vehicle 408 of the one or more second vehicles with respect to the first vehicle 402. The determined third depth map may be indicative of a third distance between the fourth vehicle 408 and the first vehicle 402 (or the third image capture device 412C). The circuitry 202 may be configured to store the determined first depth map, the determined second depth map, and the third depth map along with a first timestamp indicative of the time "T1", in the memory 204.

In some embodiments, the circuitry 202 may be configured to determine a first font size (in pixels) of one or more license plate characters ("ABCD 1234" shown in FIG. 4A) of the detected license plate 404A of the second vehicle 404 from a first image of the second vehicle 404 captured at time "T1". The first image of the second vehicle 108A may be captured by the first image capture device 412A at time "T1". The circuitry 202 may analyze the pixel information and detect different characters in the first image to further determine the first font size of one or more license plate characters of the detected license plate of the second vehicle 404. Similarly, the circuitry 202 may further determine the first font size (in pixel) of one or more license plate characters of the detected license plate of the third vehicle 406 from a second image of the third vehicle 406 captured at time "T1". The circuitry 202 may further determine the first font size in pixel of one or more license plate characters of the detected license plate of the fourth vehicle 408 from a third image of the fourth vehicle 408 captured at time "T1". The circuitry 202 may further store the determined first font size in pixel of one or more license plate characters of the detected license plate of the second vehicle 404, the third vehicle 406, and the fourth vehicle 408.

At time "T1", the first distance, the second distance, and the third distance may be equal to or greater than a minimum threshold distance. The minimum threshold distance may correspond to a minimum distance that may be maintained between any two vehicles moving on the road 410 for the safety of one or more passengers as well as the safety of the vehicles and nearby property. In case, the first distance, the second distance, and the third distance are equal to or greater than the minimum threshold distance, the circuitry 202 may not control the operations (i.e. similar to one or more operation mentioned at 312 in FIG. 3) of the first vehicle 402.

With reference to FIG. 4B, at time "T2", the circuitry 202 may be configured to determine a second font size (in pixels) of one or more license plate characters ("ABCD 1234" shown in FIG. 4B) of the detected license plate 404A of the second vehicle 404 from a fourth image of the second vehicle 404 of the captured at time "T2". For example, the fourth image of the second vehicle 404 may be captured by the same first image capture device 412A which captured the first image of the second vehicle 108A at time "T1". Similarly, the circuitry 202 may further determine the second font size in pixel of one or more license plate characters of the third vehicle 406 from a fifth image of the third vehicle 406 captured at time "T2" and may further determine the second font size in pixel of one or more license plate characters of the fourth vehicle 408 from a sixth image of the fourth vehicle 408 captured at time "T2".

The circuitry 202 may be further configured to compare the determined first font size (in pixel) of the one or more license plate characters of the second vehicle 404 captured at time "T1" with the determined second font size (in pixel) of the one or more license plate characters of the second vehicle 404 captured at time "T2". The circuitry 202 may further determine the change in the depth map of the license plate 404 of the second vehicle 404, based on the comparison of the first font size and the second font size of the license plate 404 of the second vehicle 404. The determined change in the depth map may indicate a fourth distance between the first vehicle 402 and the second vehicle 404 or indicate a change in distance between the first vehicle 402 and the second vehicle 404, as shown in FIG. 4B. For example, the fourth distance or the change in distance may be less than the minimum threshold distance and may further indicate that the first vehicle 402 may be close to the second vehicle 404 at time "T2", as shown in FIG. 4B.

It may be noted that the computation of the font size of one or more license plate characters to determine the change in depth map is merely an example. In some embodiments, the disclosed electronic apparatus 102 may determine a change in size of the detected license plate 404A (from time "T1" to time "T2") to determine the change in depth map or change in distance between the first vehicle 402 and the second vehicle 404, as shown in FIGS. 4A and 4B.

Similarly, the circuitry 202 may further compare the determined first font size in pixel of the one or more license plate characters of the third vehicle 406 captured at time "T1" with the determined second font size in pixel of the one or more license plate characters of the third vehicle 406 captured at time "T2"; and further determine the change in the depth map of the license plate of the third vehicle 406 based on the comparison. The determined change in the depth map may indicate a fifth distance or a change in distance between the first vehicle 402 and the third vehicle 406. For example, the fifth distance or the change in distance between the first vehicle 402 and the third vehicle 406 may be less than the minimum threshold distance and may further indicate that the first vehicle 402 may be close to the third vehicle 406 at time "T2", as shown in FIG. 4B.

Similarly, the circuitry 202 may further compare the determined first font size in pixel of the one or more license plate characters of the fourth vehicle 408 captured at time "T1" with the determined second font size in pixel of the one or more license plate characters of the fourth vehicle 408 captured at time "T2", and further determine the change in the depth map of the license plate of the fourth vehicle 408 based on the comparison. The determined change in the depth map may indicate a sixth distance or change in distance between the first vehicle 402 and the fourth vehicle 408. For example, the sixth distance or change in distance between the first vehicle 402 and the fourth vehicle 408 may be greater than the minimum threshold distance and may further indicate that the first vehicle 402 may be far to the fourth vehicle 408 at time "T2", as shown in FIG. 4B.

The circuitry 202 may further detect one or more events related to the second vehicle 404 based on the determined first distance (at time "T1") and the determined fourth distance (at time "T2"), or based on the change in the distance between the first vehicle 402 and the second vehicle 404. The detected one or more events related to the second vehicle 404 may indicate a higher probability of a collision of the second vehicle 404 with the first vehicle 402. In some other embodiments, the circuitry 202 may further detect one or more events related to the third vehicle 406 based on the determined second distance (at time "T1") and the determined fifth distance (at time "T2") between the first vehicle 402 and the third vehicle 406. The detected one or more events related to the third vehicle 406 may also indicate a higher probability of a collision of the third vehicle 406 with the first vehicle 402 as shown in FIG. 4B.

Based on the detection of probable collision of the first vehicle 402 with the second vehicle 404 and/or with the third vehicle 406, the circuitry 202 may further control the first vehicle 402 (based on transmission of control instructions described at 312 in FIG. 3) to change the lane of the first vehicle 402 as depicted in FIG. 4C at time "T3". In some embodiments, the circuitry 202 may control the first vehicle 402 to perform an acceleration operation (i.e. increase speed) or a turning operation (i.e. turn steering left or right) to avoid the collision with at least second vehicle 404. Therefore, the disclosed electronic apparatus 102 may avoid a future collision of the first vehicle 402 with one or both of the second vehicle 404 and the third vehicle 406 based on real-time analysis of the detected license plates of the second vehicle 404 and the third vehicle 406. Therefore, the disclosed electronic apparatus 102 associated with the first vehicle 104 may use inexpensive image capture devices and accurate license plate detection (or recognition) of nearby vehicles to control different operations (such as lane change shown in FIG. 4C) of the first vehicle 104, as compared to the expensive LiDAR systems. Thus, the disclosed electronic apparatus 102 may provide the first vehicle 402 (for example an autonomous vehicle) an accurate and inexpensive fleet management of the nearby vehicles.

It may be noted that the lane change operation of the first vehicle 402, shown in FIG. 4C is merely an example. In other embodiment, the electronic apparatus 102 may transmit a control instruction to the first vehicle 402 to perform a stop operation (i.e. apply brakes as braking operation) based on the detected event (i.e. reduction in distance shown in FIG. 4B) related to the third vehicle 406.

Figure 5A:
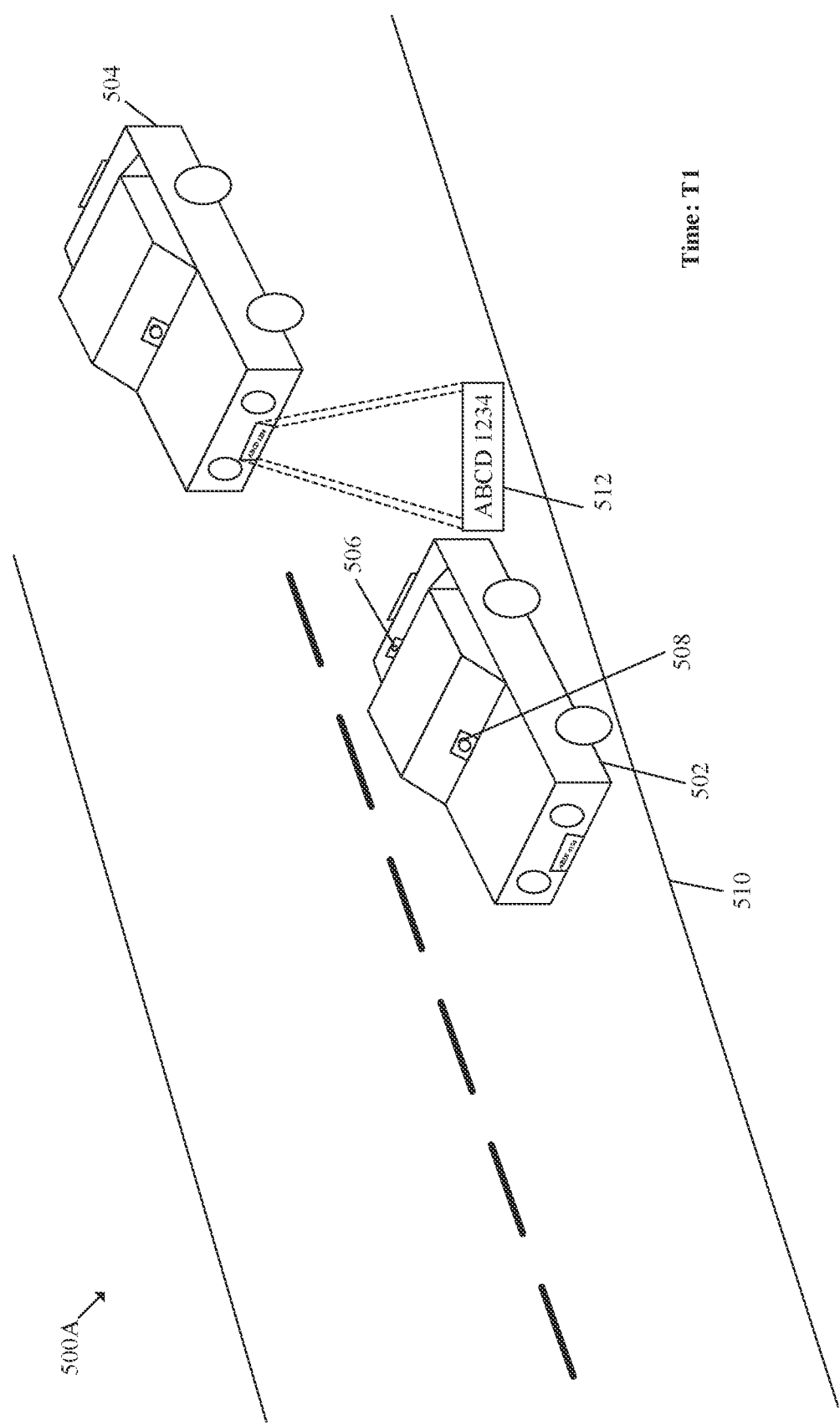
FIGS. 5A, and 5B, collectively depicts an exemplary second scenario for license plate recognition-based vehicle control, in accordance with an embodiment of the disclosure.
Figure 5B:
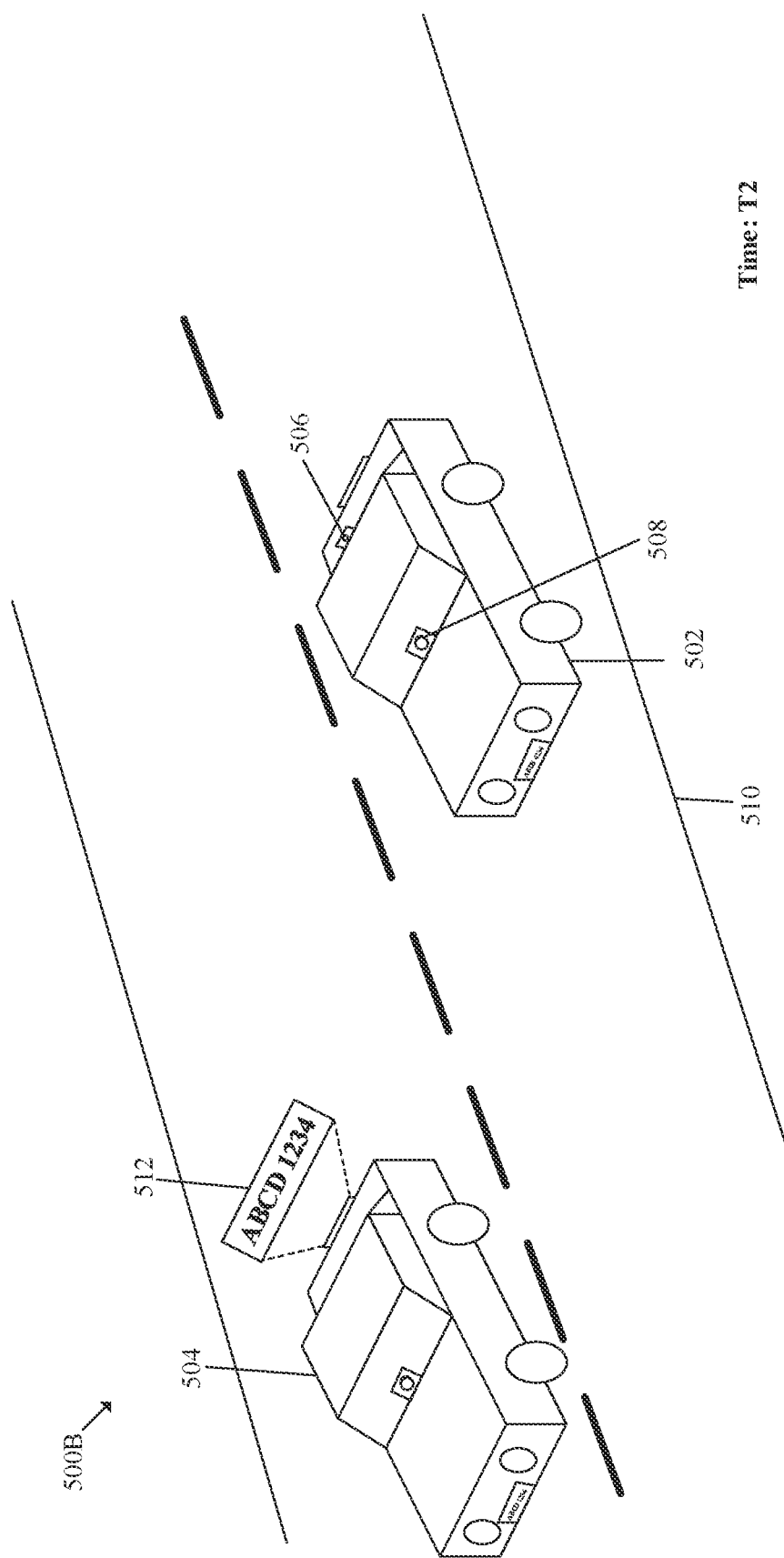

FIGS. 5A, and 5B, collectively depicts an exemplary second scenario for license plate recognition-based vehicle control, in accordance with an embodiment of the disclosure. FIGS. 5A and 5B are explained in conjunction with elements from FIGS. 1, 2, 3, 4A, 4B, and 4C. With reference to FIGS. 5A, and 5B, there is shown a first scenario 500A at time "T1", and a second scenario 500B at time "T2", respectively. With reference to FIGS. 5A and 5B, there is shown a first vehicle 502 and a second vehicle 504. With reference to FIGS. 5A and 5B, there is further shown a first image capture device 506 installed on a rear windshield of the first vehicle 502 and a second image capture device 508 installed on a front windshield of the first vehicle 502. As shown in FIG. 5A, for example, the first vehicle 502 and the second vehicle 504 may be moving on a road 510 that may be a non-overtaking road.

At time "T1", the circuitry 202 may control the first image capture device 506 to capture a first image of the second vehicle 504. The second vehicle 504 may be in a first field-of-view (FOV) of the first image capture device 506. The circuitry 202 may further detect a license plate 512 of the second vehicle 504 in the captured first image as described, for example, in FIG. 3 (at 304). The circuitry 202 may further detect the one or more license plate characters and/or the size of the detected license plate 512 of the second vehicle 504. At time "T2" (shown in FIG. 5B), the circuitry 202 may control the second image capture device 508 to capture a second image of the second vehicle 504. At time "T2", the second vehicle 504 may be in a second field-of-view (FOV) of the second image capture device 508 as shown in FIG. 5B. The circuitry 202 may further detect the license plate 512 of the second vehicle 504 in the captured second image and detect the one or more license plate characters and/or size of the detected license plate 512 of the second vehicle 504 as described, for example, at FIG. 3 (at 304 and 306). In some embodiments, the circuitry 202 may recognize the license plate 512 (for example, using LPR result of the neural network model 110) of the second vehicle 504 in both the first image and the second image, to identify or reidentify the second vehicle 504 in both images.

The circuitry 202 may further determine a change in a position of the second vehicle 504 with respect to the first vehicle 502 based on the captured first image and the second image, as shown in FIGS. 5A and 5B. The determined change in the position of the second vehicle 504 may indicate that the second vehicle 504 has over-taken (or currently overtaking) the first vehicle 502 from time "T1" to time "T2" based on the first image and the second image captured via the first image capture device 506 and the second image capture device 508, respectively. The circuitry 202 may further detect an over-taking event (i.e. one or more events) related to the second vehicle 504 based on the determined change in the position of the second vehicle 504 with respect to the first vehicle 502. In some embodiments, the circuitry 202 may determine the one or more events related to the second vehicle 504 based on the change in distance (or the depth map) between the second vehicle 504 and the first vehicle 502 which is identified based on the detected license plate 512 from different images (i.e. first image and second image) captured by one or more image capture devices on the first vehicle 502.

The circuitry 202 may further control an alert operation of the first vehicle 502 based on the detected over-taking event related to the second vehicle 504. As the road 510 may be non-overtaking road, the circuitry 202 may alert a traffic control department of an area about the over-taking event with information about the one or more license plate characters of the detected license plate 512 of the second vehicle 504. In some embodiments, the circuitry 202 may alert the second vehicle 504 via the communication network 112 (or via vehicle to vehicle (V2V) communication) about the over-taking event on the non-overtaking road 510. Therefore, the disclosed electronic apparatus 102 may also help the traffic enforcement department in enforcing traffic rules in a certain area based on notifications related to the traffic violations in the area.

Figure 6:
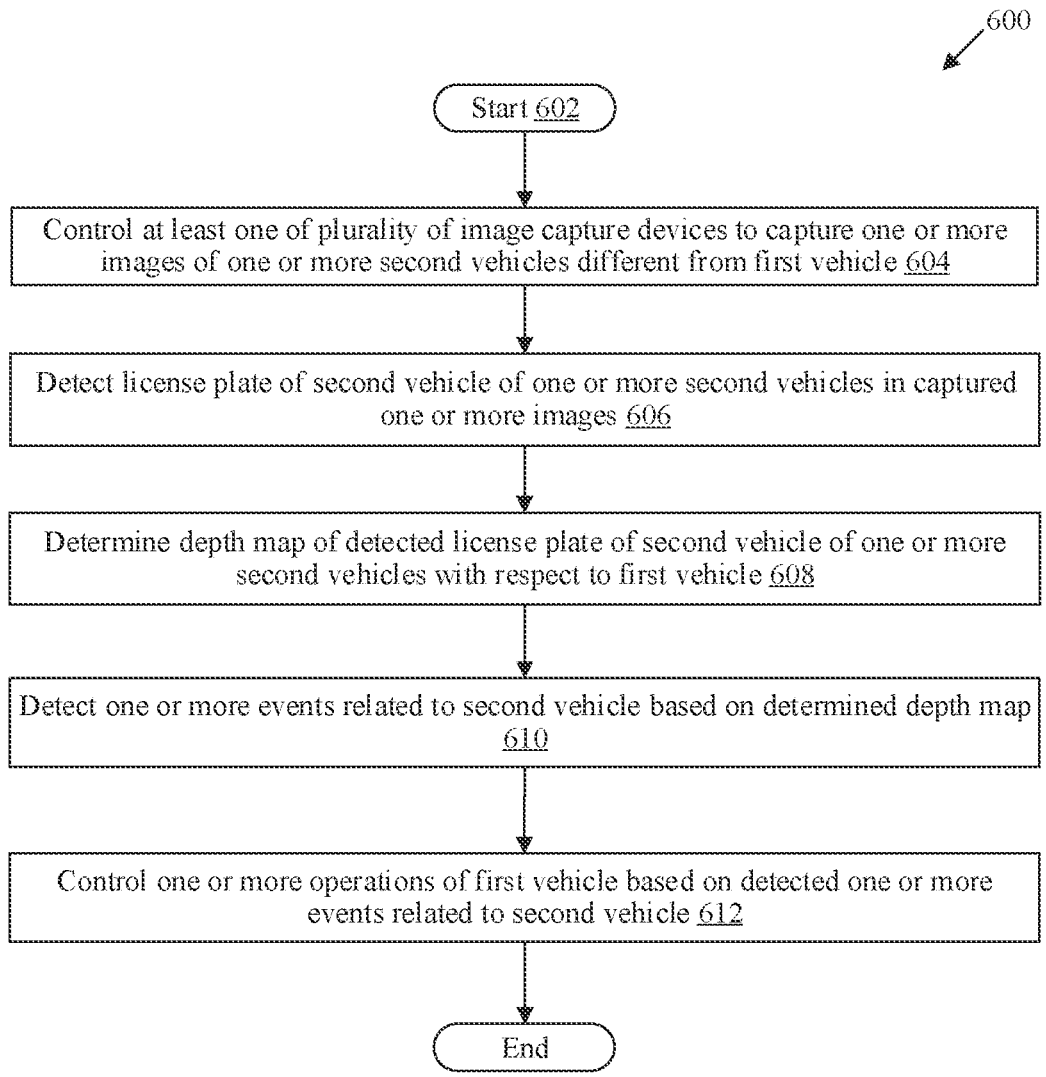
FIG. 6 is a flowchart that illustrates an exemplary method for license plate recognition-based vehicle control, in accordance with an embodiment of the disclosure.

FIG. 6 is a flowchart that illustrates an exemplary method for license plate recognition-based vehicle control, in accordance with an embodiment of the disclosure. FIG. 6 is explained in conjunction with elements from FIGS. 1, 2, 3, 4A, 4B, 4C, 5A, and 5B. With reference to FIG. 6, there is shown a flowchart 600. The operations of the exemplary method may be executed by any computing system, for example, by the electronic apparatus 102 of FIG. 1 or FIG. 2. The operations of the flowchart 600 may start at 602 and may proceed to 604.

At 604, at least one of the plurality of image capture devices 106 may be controlled to capture the one or more images 114 of the one or more second vehicles different from the first vehicle 104. In at least one embodiment, the circuitry 202 may control at least one of the plurality of image capture devices 106 to capture the one or more images 114 of one or more second vehicles (i.e. nearby vehicles) different from the first vehicle 104 as described, for example, at FIG. 3 (at 302).

At 606, the license plate 116 of the second vehicle 108A of the one or more second vehicles may be detected in the captured one or more images 114. In at least one embodiment, the circuitry 202 may detect the license plate 116 of the second vehicle 108A of the one or more second vehicles in the captured one or more images 114 (for example using the neural network model 110) as described, for example, at FIG. 3 (at 304).

At 608, the depth map of the detected license plate of the second vehicle 108A (of the one or more second vehicles) with respect to the first vehicle 104 may be determined. In at least one embodiment, the circuitry 202 may determine the depth map of the detected first license plate 118A of the second vehicle 108A of the one or more second vehicles with respect to the first vehicle 104 as described, for example, at FIG. 3 (at 306 and 308).

At 610, one or more events related to the second vehicle 108A may be detected. The one or more events related to the second vehicle 108A may be detected based on the determined depth map. In at least one embodiment, the circuitry 202 may detect one or more events related to the second vehicle 108A based on the determined depth map as described, for example, at FIGS. 3 (at 310), 4A, 4B, 4C, 5A, and 5B.

At 612, one or more operations of the first vehicle 104 may be controlled based on the detected one or more events related to the second vehicle 108A. In at least one embodiment, the circuitry 202 may control one or more operations of the first vehicle 104 based on the detected one or more events related to the second vehicle 108A as described, for example, at FIGS. 3 (at 312), 4A, 4B, 4C, 5A, and 5B. Control may pass to end.

Various embodiments of the disclosure may provide a non-transitory computer-readable medium and/or storage medium having stored thereon, instructions executable by a machine and/or a computer, such as an electronic apparatus (e.g., the electronic apparatus 102) for license plate recognition-based vehicle control. The instructions may cause the machine and/or computer to perform operations that include controlling at least one of the plurality of image capture devices (e.g., the plurality of image capture device 106) to capture one or more images (e.g., the one or more images 114) of one or more second vehicles different from a first vehicle (e.g., the first vehicle 104). The operations further include detecting a license plate (e.g., the license plate 116) of a second vehicle (e.g., the second vehicle 108A) of the one or more second vehicles in the captured one or more images. The operations further include determining a depth map of the detected license plate (e.g., the detected first license plate 118A) of the second vehicle of the one or more second vehicles with respect to the first vehicle. The operations further include detecting one or more events related to the second vehicle based on the determined depth map. The operations further include controlling one or more operations of the first vehicle based on the detected one or more events related to the second vehicle.

Certain embodiments of the disclosure may be found in an electronic apparatus and a method for license plate recognition-based vehicle control. Various embodiments of the disclosure may provide the electronic apparatus 102 that may include circuitry (such as circuitry 202) communicatively coupled to a plurality of image capture devices (such as the plurality of image capture devices 106) installed in a first vehicle (such as first vehicle 104). The first vehicle 104 may be an autonomous vehicle. The circuitry 202 may control at least one of the plurality of image capture devices 106 to capture the one or more images 114 of the one or more second vehicles different from the first vehicle 104. Each of the one or more second vehicles may lie within a predetermined distance from the first vehicle 104. The circuitry 202 may be configured to apply the neural network model 110 on each of the captured one or more images 114. The circuitry 202 may be further configured to detect the license plate 116 of the one or more second vehicles based on the application of the neural network model 110 on each of the captured one or more images 114.

The circuitry 202 may be further configured to extract a first size of the detected first license plate 118A of the second vehicle 108A based on a geo-location of at least one of the first vehicle 104 or the second vehicle 108A. The circuitry 202 may be further configured to determine a pixel size of the detected first license plate 118A of the second vehicle 108A in the captured one or more images 114. The circuitry 202 may be further configured to determine the depth map further based on the extracted first size and the determined pixel size of the detected first license plate 118A.

In another embodiment, the circuitry 202 may be further configured to determine a first font size in pixel of one or more license plate characters of the detected first license plate 118A of the second vehicle 108A from the first image 114A of the captured one or more images 114. The circuitry 202 may be further configured to determine a second font size in pixel of the one or more license plate characters of the detected first license plate 118A of the second vehicle 108A from the second image 114B of the captured one or more images 114. The circuitry 202 may further compare the determined first font size in pixel of the one or more license plate characters of the second vehicle 108A with the determined second font size in pixel of the one or more license plate characters of the second vehicle 108A. The circuitry 202 may further determine a change in the depth map based on the comparison.

In at least one embodiment, the circuitry 202 may be further configured to determine a first size in pixel of the detected first license plate 118A of the second vehicle 108A in the first image 114A of the captured one or more images 114. The circuitry 202 may be further configured to determine a second size in pixel of the detected first license plate 118A of the second vehicle 108A in the second image 114B of the captured one or more images 114. The first image 114A and the second image 114B may be captured by the first image capture device 106A of the plurality of image capture devices 106. The circuitry 202 may be further configured to compare the determined first size in pixel with the determined second size in pixel. The circuitry 202 may be further configured to determine a speed of the second vehicle 108A with respect to a speed of the first vehicle 104 further based on the comparison.

In accordance with an embodiment, the circuitry 202 may be further configured to determine a change in at least one of a distance between the second vehicle 108A and the first vehicle 104, a position of the second vehicle 108A with respect to the first vehicle 104 or a speed to the second vehicle 108A with respect to the first vehicle 104 based on the determined change in the depth map.

In accordance with an embodiment, the electronic apparatus 102 may further include the memory 204 configured to store a first set of parameters associated with each of the plurality of image capture devices 106. The first set of parameters may include at least one of a focal length, a resolution, or an image sensor height. The memory 204 may be coupled with the circuitry 202. The circuitry 202 may be further configured to determine the depth map of the detected license plate of the second vehicle 108A with respect to the first vehicle 104 further based on the first set of parameters.

In accordance with an embodiment, the plurality of image capture devices 106 may include the first image capture device 106A configured to capture the first image 114A of the one or more second vehicles from a first field-of-view (FOV), and a second image capture device 106B configured to capture the second image 114B of the one or more second vehicles from a second field-of-view (FOV). The circuitry 202 may be further configured to determine a change in a position of the one or more second vehicles or a distance between the one or more second vehicles and the first vehicle 104 based on the captured first image 114A and the second image 114B. The circuitry 202 may be further configured to detect the one or more events related to the one or more second vehicles based on the determined change in the position or the distance.

In accordance with an embodiment, the circuitry 202 may be further configured to construct a three-dimensional (3D) structure of the detected license plate of the second vehicle 108A based on the captured one or more images 114 and the determined depth map. The circuitry 202 may be further configured to control the one or more operations of the first vehicle 104 based on the constructed 3D structure.

In accordance with an embodiment, the circuitry 202 may be further configured to estimate time of the one or more events related to the second vehicle 108A based on the determined depth map. The circuitry 202 may be configured to control the one or more operations of the first vehicle 104 based on the estimated time of the one or more events related to the second vehicle 108A. In accordance with an embodiment, the one or more operations of the first vehicle 104 correspond to one of a braking operation, an acceleration operation, a lane change operation, a turning operation, an alert operation, or a stop operation.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which, when loaded in a computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made, and equivalents may be substituted without deviation from the scope of the present disclosure. In addition, many modifications may be made to adapt a particular situation or material to the teachings of the present disclosure without deviation from its scope. Therefore, it is intended that the present disclosure is not limited to the particular embodiment disclosed, but that the present disclosure will include all embodiments falling within the scope of the appended claims.

What is claimed is:

1. An electronic apparatus, comprising:
    circuitry communicatively coupled to a plurality of image capture devices installed in a first vehicle, wherein the circuitry is configured to:
        control at least one of the plurality of image capture devices to capture one or more images of one or more second vehicles different from the first vehicle;
        detect a license plate of a second vehicle of the one or more second vehicles in the captured one or more images;
        extract a specific size of the detected license plate of the second vehicle based on a geo-location of at least one of the first vehicle or the second vehicle;
        determine a pixel size of the detected license plate of the second vehicle in the captured one or more images;
        determine a depth map of the detected license plate of the second vehicle with respect to the first vehicle based on the extracted specific size and the determined pixel size of the detected license plate;
        detect one or more events related to the second vehicle based on the determined depth map; and
        control one or more operations of the first vehicle based on the detected one or more events related to the second vehicle.

2. The electronic apparatus according to claim 1, wherein each of the one or more second vehicles lies within a determined distance from the first vehicle.

3. The electronic apparatus according to claim 1, wherein the circuitry is further configured to:
    apply a neural network model on each of the captured one or more images; and
    detect the license plate of the one or more second vehicles based on the application of the neural network model on each of the captured one or more images.

4. The electronic apparatus according to claim 1, wherein the plurality of image capture devices comprises:
    a first image capture device configured to capture a first image of the one or more second vehicles from a first field-of-view (FOV); and
    a second image capture device configured to capture a second image of the one or more second vehicles from a second field-of-view (FOV), and the circuitry is further configured to:
        determine a change in a position of the one or more second vehicles or a distance between the one or more second vehicles and the first vehicle, based on the captured first image and the second image; and
        detect the one or more events related to the one or more second vehicles based on the determined change in the position or the distance.

5. The electronic apparatus according to claim 1, wherein the circuitry is further configured to:
    determine a first font size in pixel of one or more license plate characters of the detected license plate of the second vehicle from a first image of the captured one or more images;
    determine a second font size in pixel of the one or more license plate characters of the detected license plate of the second vehicle from a second image of the captured one or more images, wherein the first image and the second image are captured by a first image capture device of the plurality of image capture devices; and
    determine a change in the depth map based on the determined first font size in pixel and the determined second font size in pixel.

6. The electronic apparatus according to claim 5, wherein the circuitry is further configured to:
    compare the determined first font size in pixel of the one or more license plate characters of the second vehicle with the determined second font size in pixel of the one or more license plate characters of the second vehicle; and
    determine the change in the depth map further based on the comparison.

7. The electronic apparatus according to claim 5, wherein the circuitry is further configured to determine, based on the determined change in the depth map, a change in at least one of a distance between the second vehicle and the first vehicle, a position of the second vehicle with respect to the first vehicle, or a speed to the second vehicle with respect to the first vehicle.

8. The electronic apparatus according to claim 1, further comprising a memory configured to store a first set of parameters associated with each of the plurality of image capture devices;
    wherein the circuitry is further configured to determine the depth map of the detected license plate of the second vehicle with respect to the first vehicle further based on the first set of parameters.

9. The electronic apparatus according to claim 8, wherein the first set of parameters comprise at least one of a focal length, a resolution, or an image sensor height.

10. The electronic apparatus according to claim 1, wherein the first vehicle is an autonomous vehicle.

11. The electronic apparatus according to claim 1, wherein the circuitry is further configured to:
    estimate time of the one or more events related to the second vehicle based on the determined depth map; and
    control the one or more operations of the first vehicle based on the estimated time of the one or more events related to the second vehicle.

12. The electronic apparatus according to claim 1, wherein the circuitry is further configured to:
    construct a three-dimensional (3D) structure of the detected license plate of the second vehicle based on the captured one or more images and the determined depth map; and
    control the one or more operations of the first vehicle based on the constructed 3D structure.

13. The electronic apparatus according to claim 1, wherein the circuitry is further configured to:
- determine a first size in pixel of the detected license plate of the second vehicle in a first image of the captured one or more images;
- determine a second size in pixel of the detected license plate of the second vehicle in a second image of the captured one or more images, wherein the first image and the second image are captured by a first image capture device of the plurality of image capture devices;
- compare the determined first size in pixel with the determined second size in pixel; and
- determine a speed of the second vehicle with respect to a speed of the first vehicle further based on the comparison.

14. The electronic apparatus according to claim 1, wherein the one or more operations of the first vehicle correspond to one of a braking operation, an acceleration operation, a lane change operation, a turning operation, an alert operation, or a stop operation.

15. A method, comprising:
- in an electronic apparatus:
  - controlling at least one of a plurality of image capture devices to capture one or more images of one or more second vehicles different from a first vehicle, where the plurality of image capture devices is installed in the first vehicle;
  - detecting a license plate of a second vehicle of the one or more second vehicles in the captured one or more images;
  - extracting a specific size of the detected license plate of the second vehicle based on a geo-location of at least one of the first vehicle or the second vehicle;
  - determining a pixel size of the detected license plate of the second vehicle in the captured one or more images; and
  - determining a depth map of the detected license plate of the second vehicle with respect to the first vehicle based on the extracted specific size and the determined pixel size of the detected license plate;
  - detecting one or more events related to the second vehicle based on the determined depth map; and
  - controlling one or more operations of the first vehicle based on the detected one or more events related to the second vehicle.

16. The method according to claim 15, further comprising:
- applying a neural network model on each of the captured one or more images; and
- detecting the license plate of the one or more second vehicles based on the application of the neural network model on each of the captured one or more images.

17. The method according to claim 15, wherein
the first vehicle is an autonomous vehicle, and
the one or more operations of the first vehicle correspond to one of a braking operation, an acceleration operation, a lane change operation, a turning operation, an alert operation, or a stop operation.

18. A non-transitory computer-readable medium having stored thereon, computer-executable instructions that when executed by an electronic apparatus, causes the electronic apparatus to execute operations, the operations comprising:
- controlling at least one of a plurality of image capture devices to capture one or more images of one or more second vehicles different from a first vehicle, where the plurality of image capture devices is installed in the first vehicle;
- detecting a license plate of a second vehicle of the one or more second vehicles in the captured one or more images;
- extracting a specific size of the detected license plate of the second vehicle based on a geo-location of at least one of the first vehicle or the second vehicle;
- determining a pixel size of the detected license plate of the second vehicle in the captured one or more images;
- determining a depth map of the detected license plate of the second vehicle with respect to the first vehicle based on the extracted specific size and the determined pixel size of the detected license plate;
- detecting one or more events related to the second vehicle based on the determined depth map; and
- controlling one or more operations of the first vehicle based on the detected one or more events related to the second vehicle.

19. An electronic apparatus, comprising:
circuitry communicatively coupled to a plurality of image capture devices installed in a first vehicle, wherein the circuitry is configured to:
- control at least one of the plurality of image capture devices to capture one or more images of one or more second vehicles different from the first vehicle;
- detect a license plate of a second vehicle of the one or more second vehicles in the captured one or more images;
- determine a depth map of the detected license plate of the second vehicle of the one or more second vehicles with respect to the first vehicle;
- detect one or more events related to the second vehicle based on the determined depth map;
- estimate time of the one or more events related to the second vehicle based on the determined depth map; and
- control one or more operations of the first vehicle based on the estimated time of the one or more events related to the second vehicle.

20. An electronic apparatus, comprising:
circuitry communicatively coupled to a plurality of image capture devices installed in a first vehicle, wherein the circuitry is configured to:
- control at least one of the plurality of image capture devices to capture one or more images of one or more second vehicles different from the first vehicle;
- detect a license plate of a second vehicle of the one or more second vehicles in the captured one or more images;
- determine a depth map of the detected license plate of the second vehicle of the one or more second vehicles with respect to the first vehicle;
- detect one or more events related to the second vehicle based on the determined depth map;
- construct a three-dimensional (3D) structure of the detected license plate of the second vehicle based on the captured one or more images and the determined depth map; and
- control one or more operations of the first vehicle based on the detected one or more events related to the second vehicle and the constructed 3D structure.

* * * * *